(12) United States Patent
Ohtani

(10) Patent No.: US 6,507,702 B2
(45) Date of Patent: Jan. 14, 2003

(54) DEVICE HAVING SIGHT LINE DETECTING FUNCTION

(75) Inventor: Tadasu Ohtani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,252

(22) Filed: Sep. 17, 2001

(65) Prior Publication Data

US 2002/0048456 A1 Apr. 25, 2002

(30) Foreign Application Priority Data

Oct. 19, 2000 (JP) ........................................ 2000-318653

(51) Int. Cl.[7] .............................. G03B 17/00; A61B 3/10
(52) U.S. Cl. ........................... 396/50; 396/51; 351/210
(58) Field of Search ................. 396/50, 51; 348/333.03; 351/208, 210

(56) References Cited

U.S. PATENT DOCUMENTS

| 5,486,892 | A | | 1/1996 | Suzuki et al. ............... 354/402 |
|---|---|---|---|---|
| 5,552,854 | A | | 9/1996 | Nishimura ................... 354/410 |
| 5,598,248 | A | | 1/1997 | Nagano et al. ............... 396/51 |
| 5,717,959 | A | * | 2/1998 | Tokunaga ..................... 396/51 |
| 5,983,029 | A | * | 11/1999 | Yamada et al. ............... 396/51 |
| 6,014,524 | A | | 1/2000 | Suzuki et al. ................. 396/50 |
| 6,041,184 | A | * | 3/2000 | Inoue et al. ................... 396/51 |

\* cited by examiner

*Primary Examiner*—W. B. Perkey
(74) *Attorney, Agent, or Firm*—Fitzpatrick, Cella, Harper & Scinto

(57) ABSTRACT

A device having a sight line detecting function includes an illumination unit for illuminating an eyeball of an observer looking into an observation screen, by a plurality of light-emitting members; an image-pickup member which receives the light reflected from the eyeball; a rotational angle calculating device which calculates the rotational angle of the eyeball of the observer, using the cornea reflection images detected by the image-pickup member; and a correction unit for calculating correction data for correcting error between the calculated rotational angle value and the sight line of the observer, and for storing the correction data. In this device, the correction unit stores a plurality of correction data corresponding to the number of the cornea reflection images, with respect to the same observer.

13 Claims, 33 Drawing Sheets

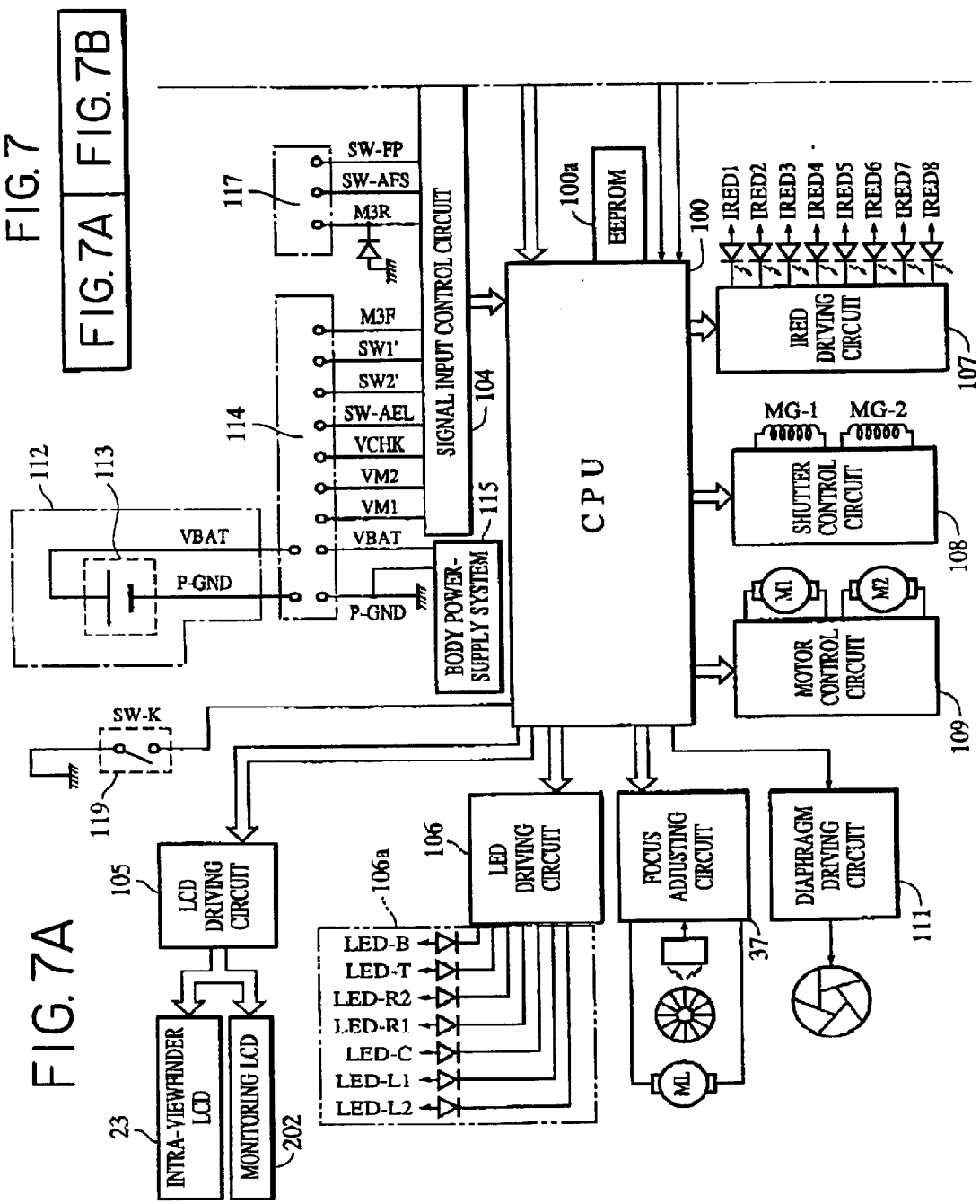

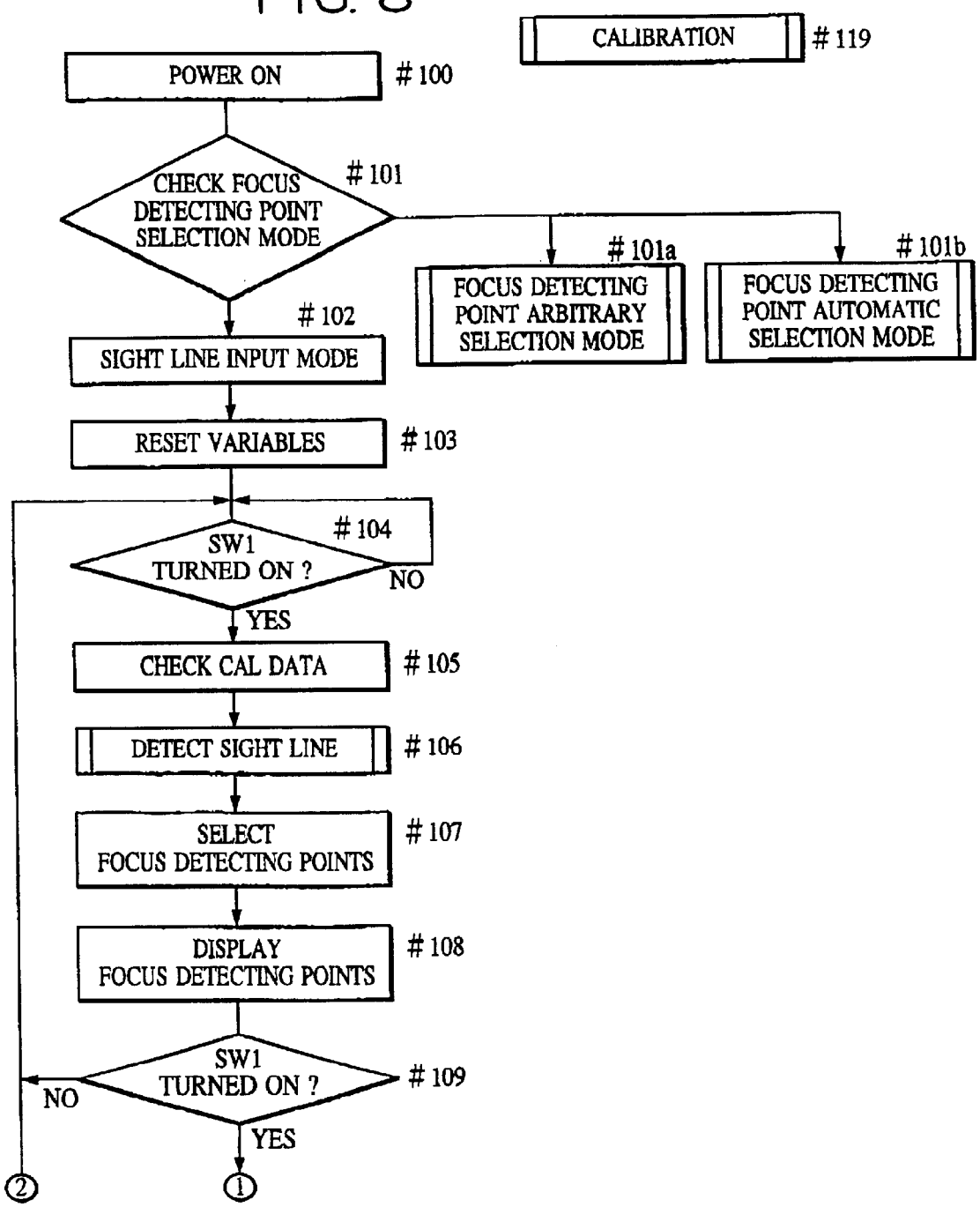

FIG. 14

| DISCRIMINATION OF P-IMAGE STATES | P-IMAGE STATE VIEW | NUMBER OF P-IMAGES | COORDINATES OF P-IMAGES USED FOR CALCULATION OF Xpo AND Ypo (O: USED) | | | | CALIBRATION DATA USED |
|---|---|---|---|---|---|---|---|
| | | | P1 (Xe',Ye') | P2 (Xd',Yd') | P3 (Xe",Ye") | P4 (Xd",Yd") | |
| FOUR P-IMAGE STATE | P3●  ●P4  P1●  ●P2 | 4 | O | O | O | O | |
| THREE P-IMAGE STATE | | 3 | O | O | O | | CALIBRATION DATA FOR THREE P-IMAGES OR MORE |
| | | 3 | O | O | | O | |
| | | 3 | | O | O | O | |
| | | 3 | O | | O | O | |
| TWO P-IMAGE STATE | | 2 | O | O | | | CALIBRATION DATA FOR TWO P-IMAGES |
| | | 2 | O | | | O | |
| | | 2 | | | O | O | |
| | | 2 | | O | | O | |
| | | 2 | O | | | O | |
| | | 2 | | | O | O | |
| ONE P-IMAGE STATE | | 1 | O | | | | |
| | | 1 | | | O | | |
| | | 1 | | | | O | |
| | | 1 | | O | | | |
| NO P-IMAGE STATE | | 0 | | | | | |

FIG. 15

| CALIBRATION DATA NUMBER | CAMERA POSTURE | EYEGLASSES | CALIBRATION DATA FOR THREE P-IMAGES OR MORE (* INITIAL VALUE) | | | | | | CALIBRATION DATA FOR TWO P-IMAGE STATE (* INITIAL VALUE) | | | | | |
|---|---|---|---|---|---|---|---|---|---|---|---|---|---|---|
| | | | ax | ay | kx | ky | box | boy | ax | ay | kx | ky | box | boy |
| 1 | NORMAL POSTURE | 1 | * | * | * | * | * | * | * | * | * | * | * | * |
| | VERTICAL POSTURE, G: UPSIDE | 1 | * | * | * | * | * | * | * | * | * | * | * | * |
| | VERTICAL POSTURE, G: DOWNSIDE | 1 | * | * | * | * | * | * | * | * | * | * | * | * |
| 2 | NORMAL POSTURE | 1 | * | * | * | * | * | * | * | * | * | * | * | * |
| | VERTICAL POSTURE, G: UPSIDE | 1 | * | * | * | * | * | * | * | * | * | * | * | * |
| | VERTICAL POSTURE, G: DOWNSIDE | 1 | * | * | * | * | * | * | * | * | * | * | * | * |
| 3 | NORMAL POSTURE | 1 | * | * | * | * | * | * | * | * | * | * | * | * |
| | VERTICAL POSTURE, G: UPSIDE | 1 | * | * | * | * | * | * | * | * | * | * | * | * |
| | VERTICAL POSTURE, G: DOWNSIDE | 1 | * | * | * | * | * | * | * | * | * | * | * | * |
| 4 | NORMAL POSTURE | 1 | * | * | * | * | * | * | * | * | * | * | * | * |
| | VERTICAL POSTURE, G: UPSIDE | 1 | * | * | * | * | * | * | * | * | * | * | * | * |
| | VERTICAL POSTURE, G: DOWNSIDE | 1 | * | * | * | * | * | * | * | * | * | * | * | * |
| 5 | NORMAL POSTURE | 1 | * | * | * | * | * | * | * | * | * | * | * | * |
| | VERTICAL POSTURE, G: UPSIDE | 1 | * | * | * | * | * | * | * | * | * | * | * | * |
| | VERTICAL POSTURE, G: DOWNSIDE | 1 | * | * | * | * | * | * | * | * | * | * | * | * |

FIG. 24

End -1

DEVICE HAVING SIGHT LINE DETECTING FUNCTION

BACKGROUND OF THE INVENTION

1. Field of the Invention

The present invention relates to an improvement in a device having a sight line detecting function for use in cameras or the like.

2. Description of the Related Art

There has been proposed various devices for detecting which position an observer is observing on an observed surface, so-called devices for detecting sight line (visual axis), such as eye cameras.

For example, in U.S. Pat. No. 5,486,892 and No. 6,014,524, a parallel light flux from a light source is projected to the anterior ocular segment of the eyeball of an observer, and the sight line of the observer is determined making use of the cornea reflection images by the light reflected from the cornea and image-forming position of the pupil.

Also, U.S. Pat. No. 5,598,248 proposes an optical device (camera) having a sight line detecting device arranged to perform various types of photographing using a sight-line calibration method wherein personal differences in the sight lines of photographers are corrected.

FIG. 25 is a diagram explaining the principle of sight line detection.

In FIG. 25, reference numerals 13a and 13b each denote an infrared-emitting diode (hereinafter abbreviated as IRED) projecting an infrared light. The IREDs 13a and 13b are disposed along the X-axis direction so as to be substantially symmetrical with respect to the optical axis (z-axis) of the light-receiving lens 12, and illuminate a user's eyeball 17 from the lower sides (positions offset in the y-axis direction). A portion of the illuminating light reflected from the eyeball is converged on a CCD 14 through the light-receiving lens 12. Here, reference numeral 17a denotes the optical axis of the eyeball, 17b denotes cornea, and 17c denotes iris.

FIG. 26A is a schematic diagram showing an eyeball image projected to the CCD 14, and FIG. 26B is a diagram showing an intensity distribution of the signal from the output line of the CCD 14. Hereinafter, descriptions of the sight line detection will be made with reference to FIGS. 25, 26A, and 26B.

The infrared light projected from the IRED 13b illuminates the cornea 17b of the user's eyeball 17. Herein, the image d reflected from the cornea (virtual image; hereinafter referred to as a "Purkinje image" or a "P-image"), which image d is formed of a portion of the infrared light reflected from the surface of the cornea 17b, is condensed by the light-receiving lens 12, and forms an image at the position d' on the CCD 14. Likewise, the infrared light projected from the IRED 13a illuminates the cornea 17b of the user's eyeball 17. Herein, the Purkinje image e formed of a portion of the infrared light reflected from the surface of the cornea 17b, are condensed by the light-receiving lens 12, and forms an image at the position e' on the CCD 14.

The light flux from the end portions a and b of the iris 17c form images of the end portions a and b at the positions a' and b' on the CCD 14, respectively, through the light-receiving lens 12. When the rotational angle θ of the optical axis of the eyeball 17 with respect to the optical axis of the light-receiving lens 12 is small, letting the x-coordinates of the end portions a and b of the iris 17c be xa and xb, respectively, the coordinate xc of the center position of the pupil 17d is expressed by the following equation.

$$xc \approx (xa+xb)/2 \quad (1)$$

Also, the x-coordinate of the midpoint between the Purkinje images d and e substantially coincides with the x-coordinate X0 of the center of curvature o of the cornea 17b.

Therefore, if the x-coordinates of the occurrence positions d and e of the Purkinje images are represented by (Xd', Xe'), and the standard distance from the center of curvature o of the cornea 17b to the center c of the pupil 17d is represented by Loc, the rotational angle θx of the eyeball optical axis 17a of the eyeball 17 satisfies the following relation.

$$Loc \times \sin \theta x \approx (Xd'+Xe')/2 - xc \quad (2)$$

Therefore, by detecting the positions of each of the characteristic points of the eyeball 17 (the centers of each of the Purkinje images and the pupil) projected on the CCD 14, the rotational angle θ of the eyeball optical axis 17a of the eyeball 17 can be determined.

The rotational angle θ of the eyeball optical axis 17a are determined based on the above equation (2) as follows:

$$\beta \times Loc \times \sin \theta x \approx \{(Xp0-\delta x)-Xic\} \times Ptx \quad (3)$$

$$\beta \times Loc \times \sin \theta y \approx \{(Yp0-\delta y)-Yic\} \times Pty \quad (4)$$

Here, β denotes an image-forming magnification determined by the position of the eyeball 17 with resect to the light-receiving lens 12, and is virtually obtained as a function of the distance |Xd'-Xe'| between the two Purkinje images.

Also, θx and θy denote the rotational angles of the eyeball optical axis on the z-x plan, and y-z plan, respectively. (Xp0, Yp0) represents the coordinates of the midpoint between the two Purkinje images on the CCD 14, and (Xic, Yic) represents the center coordinates of the pupil. Ptx and Pty denote pixel pitches in the direction of the x-axis and the y-axis, respectively. δx and δy denote correction terms for correcting the coordinates of the midpoint of a Purkinje image. The correction terms include a component for correcting errors occurring by the user's eyeball being illuminated not by parallel light but by diverging light. Here, δy includes also a component for correcting an offset component occurring by the user's eyeball being illuminated by diverging light from the lower eyelid.

When calculating the rotational angle (θx, θy) of the optical axis 17a of the user's eyeball, the user's gazing point (x, y) on the observed surface is determined by the following expression.

$$X[mm]=m \times ax \times (\theta x+bx) \quad (5)$$

$$Y[mm]=m \times ay \times (\theta y+by) \quad (6)$$

Here, the x-axis direction means the horizontal direction with respect to the observer, and the y-axis direction means the vertical direction with respect to the observer. Coefficient m denotes the transformation coefficient for performing a transformation from the rotational angle of the eyeball 17 to the coordinates of the observed surface. Coefficients ax, bx, ay, and by each denote gazing point calibration coefficient, and each correspond to correction coefficient for making the rotational angle of the user's eyeball coincide with the gazing point on the observed surface.

Now, a calculation method for the correction terms δx and δy for the midpoint position between Purkinje images will be described with reference to FIGS. 27 to 29.

The intersection point between the straight line connecting the IRED 13a and the IRED 13b and the optical axis (z-axis) of the sight line detecting optical system is set to the origin point. The IREDs 13a and 13b are disposed along the X-axis direction so as to be substantially symmetrical with respect to the origin point, and the x-ordinates and y-ordinates thereof are each the same. Let the ordinates of the IRED 13a be (−Sxi, Syi, Szi), the ordinates of the IRED 13b be (Sxi, Syi, Szi), and the ordinates of the center o of curvature of the cornea of the photographer's eyeball be (Sxc, Syc, Szc). Also, let the center coordinates of the CCD be (Xs, Xy).

The midpoint P0 between the Purkinje images d and e is equivalent to the position of the Purkinje image occurring due to a single IRED disposed at the midpoint between the IREDs 13a and 13b. Since the sight-line calculation equation is based on the coordinates of the midpoint P0 between the two Purkinje images, if the distance from the midpoint (0, Si, Zi) between the IREDs 13a and 13b to the center of curvature o of the cornea is represented by L, L is given by the following expression.

$$L=\sqrt{\{Sxc^2+(Syi-Syc)^2+(Szi-Szc)^2\}} \quad (7)$$

The distance K from the surface of the cornea to the occurrence position of the Purkinje image is expressed as follows, using the Abbe's invariant.

$$K=Rc(L+Rc)/\{2(L+Rc)-Rc\} \quad (8)$$

Also, the shift amount δx of the midpoint P0 between the Purkinje images P1 and P2 in the x-axis direction (the shift amount in the CCD coordinate system; Δx in the eyeball coordinate system) satisfies the following relationship.

$$L/(K-Rc)=\{(Xp0-Xs)+\delta x\}/\delta x \quad (9)$$

When developing the above equation, the shift amount δx is calculated as $$\delta x=Rc(Xp0-Xs)/\{2(L+Rc)\} \quad (10)$$

Likewise, the shift amount δy of the midpoint P0 between the Purkinje images P1 and P2 in the y-axis direction satisfies the following relationship.

$$L/(K-Rc)=\{(Xp0-Ys)+Syi(\beta p/Pty)+\delta y\}/\delta y \quad (11)$$

When developing the above equation, the shift amount δy is calculated as $$\delta y=Rc\{(Yp0-Ys)+Syi(\beta p/Pty)\}/\{2(L+Rc)\} \quad (12)$$

Here, if we define the image-forming magnification β of the sight line detecting optical system as a secondary function of the distance Sz from the exit surface (origin point) of the eye piece lens, β is given by the following expression.

$$\beta=b1 \times Sz^2+b2 \times Sz+b3 \quad (13)$$

Here, coefficients b1 and b3 are calculated by firstly obtaining the image-forming magnification at a predetermined distance by an optical simulation, and then by secondarily approximating the obtained values.

Letting the distance from the apex of the cornea in the z-axis direction be Szp, the image-forming magnification βp is calculated as $$\beta p=b1(-Szp-Szc)^2+b2(-Szp-Szc)+b3 \quad (14)$$

Hereinafter, in order to determine Szp and Szc, a plurality of times of calculation routines are executed so as to make Szp and Szc converge.

From the comparison between the equation (9) with the equation (11), it is noticed that the equation (11) includes an additional term "Syi(βp/Pty)". The reason why this additional term has occurred, is because, as shown in FIG. 29, an IRED does not exist along the y-axis direction across the z-axis with respect to the IREDs. 13a and 13b unlike the case in FIG. 28, and hence, a Purkinje image does not exist. The shift amount δy in the y-axis direction, therefore, cannot be obtained directly from the midpoint P0 between the Purkinje images P1 and P2.

Therefore, in the shift amount δy in the y-axis direction, apart from errors in the above-described secondary approximation of the coefficients b1 to b3, other approximate calculation errors in the convergence calculation, and quantization errors in a microcomputer are added with respect to the shift amount δx in the x-axis direction, with the result that the shift amount δy in the y-axis direction is interior in the accuracy to δx. Therefore, in the rotational angle (θx, θy) of the optical axis 17a of the user's eyeball, which rotational angle is determined by the equation (3) including θx and the equation (4) including θy, θy has a defect of being interior in the accuracy to θx.

Once the rotational angle θx and θy of the photographer' eyeball has been calculated from the equation (3) including θx and the equation (4) including θy, correction coefficients ax, bx, ay, and by for personal differences are obtained from the above equations (4) and (5), and thereby the coordinates on a focusing plate are calculated.

Here, as possible means for avoiding the defect of θy being interior in the accuracy to θx, there is a method wherein an IRED 13e provided at a position along the y-axis direction across the z-axis with respect to the IREDs 13a and 13b, is used for illumination to obtain a new Purkinje image, and wherein, by obtaining θy in the same manner as in the case of θx, θy is provided with the same accuracy as that of θx. In short, the IRED 13e is arranged so as not to be on the same straight line with the IREDs 13a and 13b.

This will be elucidated with reference to FIGS. 30 and 31 wherein the illumination of the IRED 13e has been added.

As in the case of FIG. 27A, FIG. 30 shows the positions of the characteristic points of the eyeball 17 (the centers of each of the Purkinje images and the pupil) projected on the CCD 14. Herein, a new Purkinje image 3 exists at the coordinates (Xe″, Ye″), the coordinates of the conventional Purkinje images P1 and P2 corresponding to the IREDs 13a and 13b exist at (Xe', Ye') and (Xd', Yd'), respectively, and the midpoint coordinates (Xp1, Yp1) of the Purkinje images P1 and P3 which are arranged parallel to the y-coordinate, constitute a P-image center in the y-axis direction.

FIG. 31 is representative of the above-described explanation, using a y-x plan eyeball coordinate diagram as in the case of FIG. 29.

The above equation (4) can be represented as $$\beta \times Loc \times \sin \theta y \approx \{(Yp1-\delta y)-Yic\} \times Pty \quad (15)$$

The correction term δy can be expressed as $$\delta y=\{Rc(Yp1-Ys)\}/2\{(L+Rc)\} \quad (16)$$

This indicates that the shift amount δy in the y-axis direction can be expressed by an equation similar to the equation (10) giving the shift amount δx in the x-axis direction.

Meanwhile, U.S. Pat. No. 5,552,854 also discloses a device wherein three illumination light sources are arranged. In this disclosure, however, among the three light sources, two light sources are selected so as not to put the center of curvature of the cornea therebetween, and an Purkinje image is obtained to calculate the sight line.

When detecting the sight line of an observer, a Purkinje image corresponding to illumination light sources is not necessarily obtained. That is because, particularly in the case of a Purkinje image on the upside corresponding to the IRED 13e or 13b on the inside, the illumination light is blocked by the upper eyelid and eyelash of the observer, depending on observation conditions and personal differences.

Accordingly, there is a proposal to add an IRED 13f, which is provided along the y-axis across the z-axis with respect to the IRED 13a and 13b, and to use it for illumination. By doing so, a probability increases that at least one of the Purkinje images corresponding to the IREDs 13e and 13f will be achieved, even if the illumination light source is blocked by the upper eyelid and eyelash of the observer, depending on observation conditions and personal differences.

When at least three Purkinje images have been obtained corresponding to the IREDs 13a, 13b, 13e, and 13f, the accuracy of the eyeball rotational angles θx and θy can be made equal to each other, by properly providing the correction coefficients ax, bx, ay, and by for personal differences, as described above.

FIG. 32 shows the positions of the characteristic points (the centers of each of the Purkinje images and the pupil) of the eyeball 17 projected on the CCD 14 when the four Purkinje images have been obtained, as in the cases of FIGS. 27 and 30.

When the four Purkinje images corresponding to the IREDs 13a, 13b, 13e, and 13f, each of the center positions of the Purkinje images in the x-axis and y-axis directions is calculated from not only the coordinates of two Purkinje images, but also from those of the four Purkinje images, with respect to FIGS. 28 to 31. Therefore, by properly providing the correction coefficients ax, bx, ay, and by for personal differences, the accuracy of the eyeball rotational angles can be more improved not only for θy, but also for θx.

However, even if the new illumination light sources IRED 13e and 13f are thus added, the Purkinje image corresponding to one of these Purkinje images is not necessarily obtained. There is a possibility that neither of the two Purkinje images is obtained. When no Purkinje image corresponding to the IRED 13e and 13f is obtained, but only the Purkinje images corresponding to the IRED 13a and 13b are obtained, δy can be obtained from the equation (12). On the other hand, when a Purkinje image corresponding to one of the IRED 13e and 13f is obtained, δy can be obtained from the equation (16). Therefore, even if the four illumination light sources IREDs 13a to 13d are employed, each of correction coefficients ay and by may change into a different value, depending on whether Purkinje images by the IREDs 13e and 13f can be obtained or not. This raises a possibility that the Purkinje images obtained during a sight line detecting operation do not appropriately correspond to those obtained during the calculation of calibration coefficients.

It is, therefore, necessary to ensure a sight line detecting function which can always perform reliable sight line detection, irrespective of whether Purkinje images by the IREDs 13e and 13f can be obtained or not. In this respect, the sight line detecting function still has a room for improvement.

SUMMARY OF THE INVENTION

In accordance with one aspect of the present invention, by obtaining a cornea reflection image from an image pickup member which receives reflected light from an eyeball, correction data are calculated for correcting the error between the eyeball rotational angle which is formed by the rotation of an observer's eyeball, and the observer's sight line. With respect to the same observer, a plurality of the correction data corresponding to the number and the configuration of cornea reflection images is calculated. Thereby, even when a portion of cornea reflection images cannot be obtained, sight line detection can be performed using the correction data corresponding to the number and the configuration of the cornea reflection images which are obtained at that time.

In accordance with another aspect of the present invention, from the cornea reflection images which were simultaneously detected, a plurality of correction data corresponding to different numbers of cornea reflection images is calculated. For example, when three cornea reflection images are detected, the correction data corresponding to three cornea reflection images, and the correction data corresponding to two cornea reflection images, are calculated. This saves us time and labor of detecting cornea reflection images over a plurality of times to calculate a plurality of correction data corresponding the number of the cornea reflection images.

Further objects, features and advantages of the present invention will become apparent from the following description of the preferred embodiments with reference to the attached drawings.

BRIEF DESCRIPTION OF THE DRAWINGS

FIG. 7, including FIGS. 7A and 7B, is a block diagram showing the main section of the electrical construction in the camera in FIG. 1;

FIG. 8 is a flowchart illustrating a portion of a sequence of operations of the camera in FIG. 1;

FIG. 14 is a view explaining the states of Purkinje images in accordance with an embodiment of the present invention;

FIG. 15 is a view explaining the calibration data numbers and the calibration data in accordance with an embodiment of the present invention;

FIG. 24 is a view explaining the display for the calibration number during the above-described calibration operation;

DESCRIPTION OF THE PREFERRED EMBODIMENTS

Figure 1:
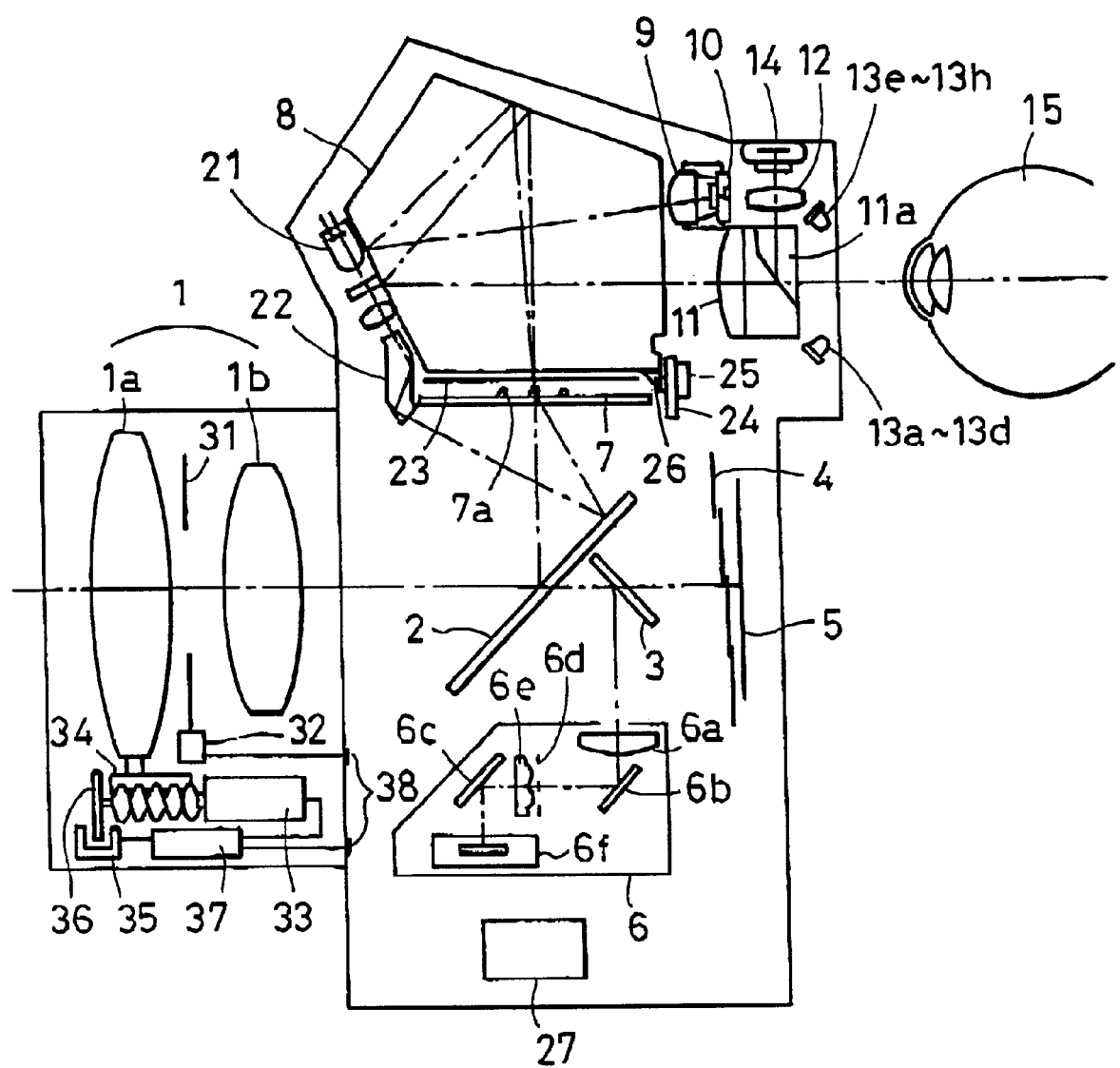
FIG. 1 is an optical arrangement view of a camera in accordance with an embodiment of the present invention.

FIG. 1 is an optical arrangement view showing a main section of a single-lens reflex camera having a sight line detecting function in accordance with an embodiment of the present invention.

In FIG. 1, reference numeral 1 denotes a photographing lenses. For convenience's sake, in the figure, these lenses are represented as two lenses 1a and 1b, but, in reality, they are constituted of numerous lenses. Reference numeral 2 denotes a main mirror which enters photographing optical path or retreats therefrom depending on observation state and photographing state, 3 denotes sub-mirror reflecting the light flux which has passed through the main mirror 2, toward the lower side of camera body, and 4 denotes a shutter. Numeral 5 denotes a photosensitive member, which is constituted of a silver-salt film, a CCD, or a solid-state image pickup member such as MOS type.

Figure 2:
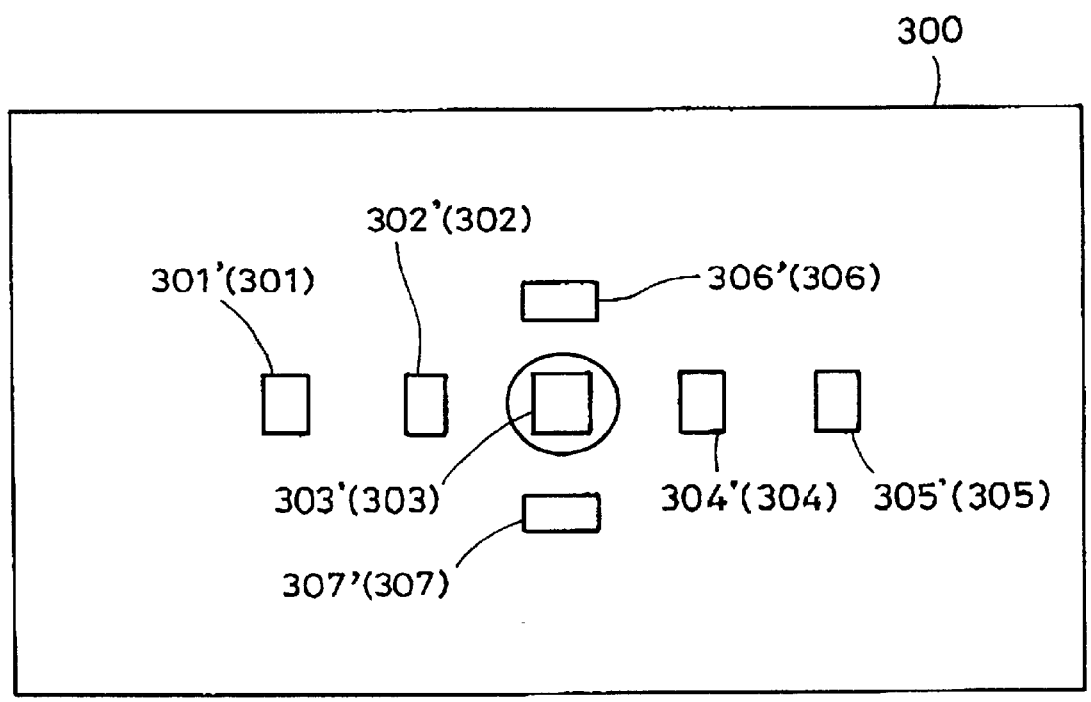
FIG. 2 is a view showing the viewfinder view field and an intra-viewfinder display of the camera in FIG. 1.

Reference numeral 6 designates a disposed in the vicinity of an image-forming surface. This focus detecting device 6 comprises a field lens 6a, reflection mirrors 6b and 6c, a diaphragm 6d, a secondary coupling lens 6e, a line sensor 6f formed of a plurality of CCDs, etc, and adopts a well-known phase-difference system. The focus detecting device 6 has, within the photographing visual field, seven focus detecting points allowing defocus information to be obtained at the positions each corresponding to the focus detecting point marks 301' to 307' (see FIG. 2), which is seven areas displayed within the viewfinder observation surface, and at which focus detecting are performed, the focus detecting point marks 301' to 307' being formed as will be described later. The position of the focus detecting point marks 301' to 307' coincide with the focus detecting points when viewed through the viewfinder observation surface. For the sake of convenience, therefore, these focus detecting points will be hereinafter represented as 301 to 307, within the viewfinder observation screen 300, as shown in FIG. 2.

Reference numeral 7 designates a focusing plate disposed on the image-forming surface of the photographing lens 1, and 8 designates a pentaprism for changing viewfinder optical path. Numerals 9 and 10 designate an image-forming lens and a photometric sensor for measuring the brightness of an object within the observation screen, respectively. Here, the image-forming lens 9 brings the focusing plate 7 and the photometric sensor 10 into a conjugational relation, via the reflected light path within the pentaprism 8.

Figure 4:
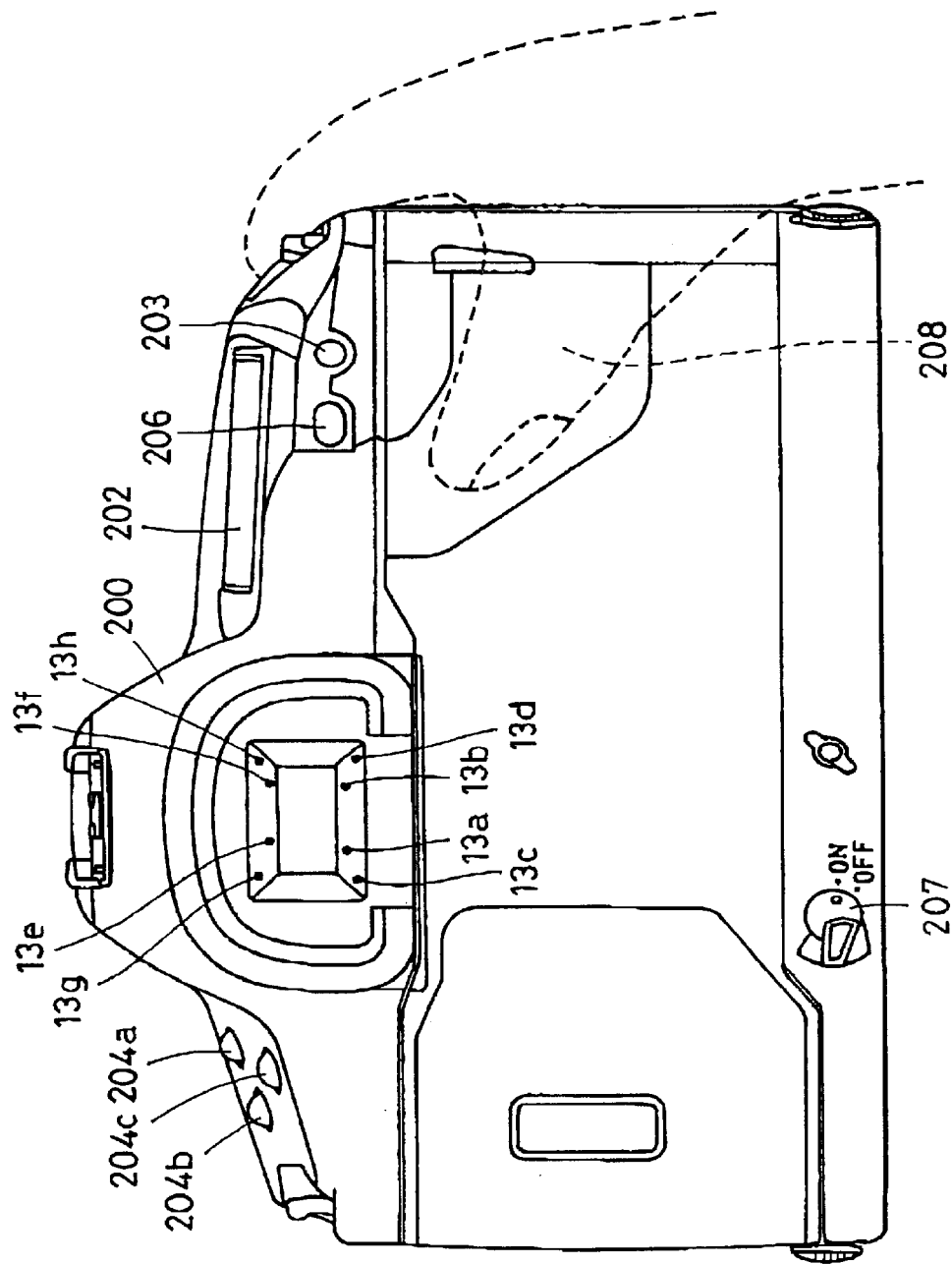
FIG. 4 is a rear elevation showing the appearance of the camera in FIG. 1.

Reference numeral 11 denotes an eyepiece lens 11 having a beam splitter 11a, which is disposed behind the exit surface of the pentaprism 8. The eyepiece lens 11 is used for the observation of the focusing plate 7 by a photographer's eye 15. The beam splitter 11a is, for example, constituted of a dichroic mirror, which transmits visible lights, and which reflects infrared lights and visible lights (infrared lights) close to the infrared lights. Reference numeral 14 denotes CCDs formed by two-dimensionally arranging photoelectric element array disposed so as to have a conjugation relation with the vicinity of the pupil of the photographer's eye 15, which exists at a predetermined position with respect to a light-receiving lens 12. The CCD 14 and the light-receiving lens 12 jointly form one component of light-receiving means. Numerals 13a to 13d, and 13e to 13h denote eight IREDs (see FIG. 4 shown later), which are illumination light sources for the photographer's eye 15. These IREDs are arranged around the eyepiece-lens 11.

Reference numeral 21 designates a superimposing LED, which has a high luminance such as to be viewable even within a bright object image. The light emitted from this LED reflects on the main mirror 2 via a projection prism 22, and is bent at a minute prism array 7a provided at the display portion of the focusing plate 7, in the direction perpendicular thereto. Then, the light passes through the pentaprism 8 and eyepiece lens 11 and reaches the photographer's eye 15.

As described above, the minute prism array 7a is formed in a frame-like shape on the focusing plate 7 at the positions corresponding to the above-described plural focus detecting points 301 to 307. By illuminating the minute prism array 7a by the seven LEDs 21 corresponding to each of the components of the minute prism array 7a (these seven LEDs are composed of LED-L1, LED-L2, LED-C, LED-R1, LED-R2, LED-T, and LED-B, and will be shown later in FIG. 7), focus detecting point marks 301', 302', 303', 304', 305', 306', and 307' glow within the viewfinder observation screen 300, as shown in FIG. 2. Thereby, the relationship between the object and the focus detecting points 301 to 307, which allow defocus information to be obtained within the photographing screen, can be observed.

Figure 3:
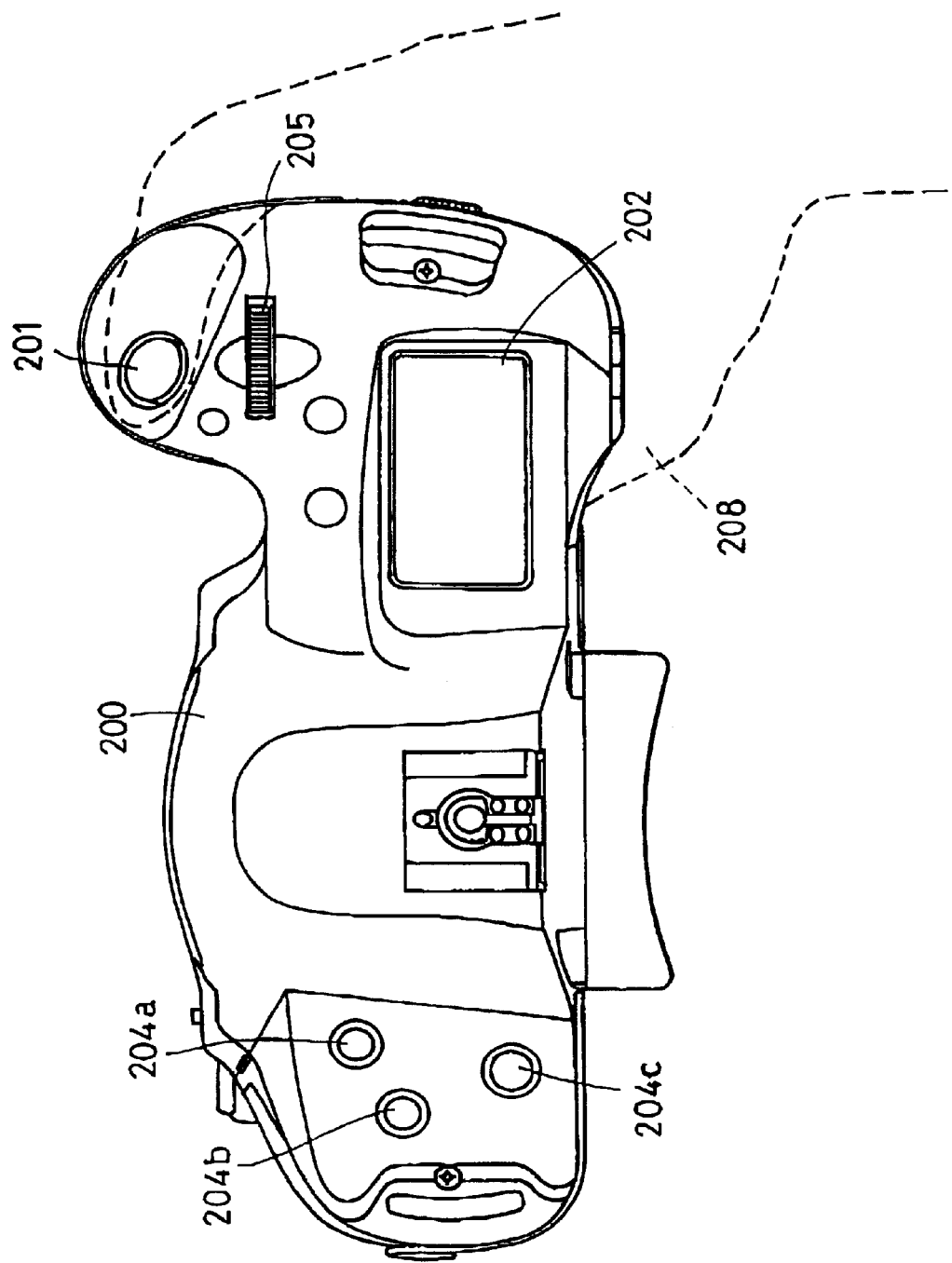
FIG. 3 is a top plan view showing the appearance of the camera in FIG. 1.

Herein, the focus detecting point marks 301', 305', 306', and 307', which are disposed at the ends of the left side, right side, upside, and downside of the screen in FIG. 2, are also used (blinking or lighting-up) in the calibration mode, which is set by the simultaneous pushing of mode buttons 204b and 204c (see FIG. 3 shown later), and personal difference correction information is calculated. Specifically, as known, sight line information is determined by the photographer gazing blinking focus detecting point marks 301', 305', 306', and 307' in sequence, and on the basis of this sight line information and the pupil diameter of the photographer, personal difference correction information such as the distance between the eyeball focal axis and the visual axis, and the degree of sensitivity of the eyeball rotation are obtained. Here, the personal difference correction information means sight line correction data (sight line correction coefficients). In the camera in accordance with this embodiment, calibration data are accumulated for every calibration which the photographer repeats, and sight line correction data are accumulated by a predetermined averaging work. Since the present invention is not directly related to this calibration, this calibration will be omitted from detailed description.

Returning to FIG. 1, reference numeral 23 designates a view field mask for forming a viewfinder observation view field. Numeral 24 designates an intra-viewfinder LCD for displaying photographing information, on the outside of the viewfinder view field. The LCD 24 is illuminated by a LED(F-LED) 25, and the light which has passed the LCD 24 is introduced into the viewfinder by a triangular prism 26. Thereupon, photographing information is displayed on a display portion 308 outside the viewfinder screen, and the photographer can observe the photographing information. Numeral 27 designates a posture detecting device for detecting the posture of the camera.

Reference numeral 31 denotes a diaphragm provided in the photographing lens 1, and 32 denotes a diaphragm driving device including a diaphragm driving circuit 111. Numeral 33 denotes a lens driving motor, and 34 denotes a lens driving member constituted of driving gears. Numeral 35 designates a photo coupler, which detects the rotation of the pulse plate 36 operatively connected to the lens driving member 34, and thereby transmits the detected result to a lens focus adjusting circuit 37. The lens focus adjusting circuit 37 drives the lens driving motor 33 by a predetermined amount, on the basis of this information and the lens driving amount information from the camera side, and moves the focus adjusting lens 1a within the photographing lens 1 to the in-focus position. Numeral 38 denotes mount contacts constituting an interface between a known camera body and the interchangeable photographing lens 1.

FIGS. 3 and 4 are external views illustrating the camera body having the above-described construction (the interchangeable lens shown in FIG. 1 is not shown here), wherein FIG. 3 is a top plan view, and FIG. 4 is a rear elevation.

Figure 5A:
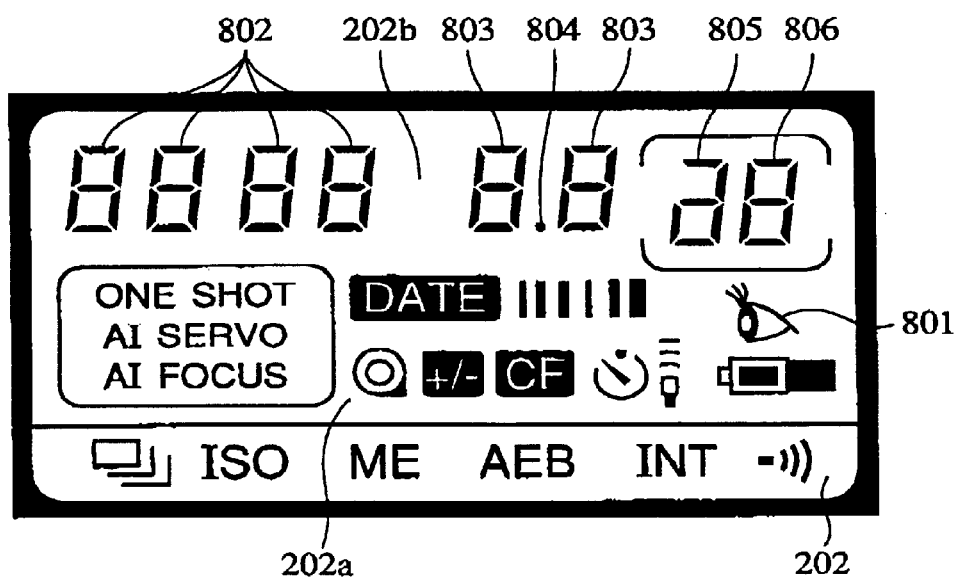
FIGS. 5A and 5B are views explaining displays on an external LCD and an intra-viewfinder LCD, respectively, which are provided in the camera in FIG. 1.

In these figures, reference numeral 200 denotes the camera body, and 201 denotes release button. Number 202 denote a monitoring LCD as an external monitor display device, which comprises, as shown in FIG. 5A, a fixed segment display portion 202a for displaying a predetermined pattern, and a seven-segment display portion 202b for displaying variable numeral values (the details thereof will be described later). Reference numeral 203 denotes a AE lock button for holding a photometric value. Numeral 204a, 204b, and 204c denote mode buttons, which allow the selection of photographing modes and the like. For example, the simultaneous pushing of the mode buttons 204b and 204c provides the calibration mode for performing the above described calibration.

Reference numeral 205 designates an electronic dial. By rotating the electronic dial 205 to generate a click pulse, a mode which can be further selected in the mode selected by the mode button 204a, 204b, or 204c, as well as a set value are selected. For example, when selecting the shutter-priority photographing mode by pushing the mode button 204a, the currently set mode and the currently set shutter speed are displayed on the intra-viewfinder LCD 24 and the monitoring LCD 202. After releasing the mode button 204a, when the photographer further rotates the electronic dial 205, the shutter speed changes from the currently set shutter speed to others in sequence, in accordance with the rotational direction. In this manner, the camera is arranged to allow the photographer to select a photographing mode from among the photographing modes: a program AE mode, a shutter-priority AE mode, an aperture-priority AE mode, an object-depth priority AE mode, and a manual exposure mode, and to allow the photographer to set the photographing contents of the selected photographing mode.

Reference numeral 206 denotes a focus dividing point selection mode button. Numeral 207 denotes a power-supply switch of the camera. By turning the power-supply switch on, the camera becomes operative, and by turning the switch off, the camera is set to a locked position which makes the camera inoperative. Numeral 208 indicated by dotted lines designates a state of the photographer's right hand when he or she holds the camera.

Figure 5B:
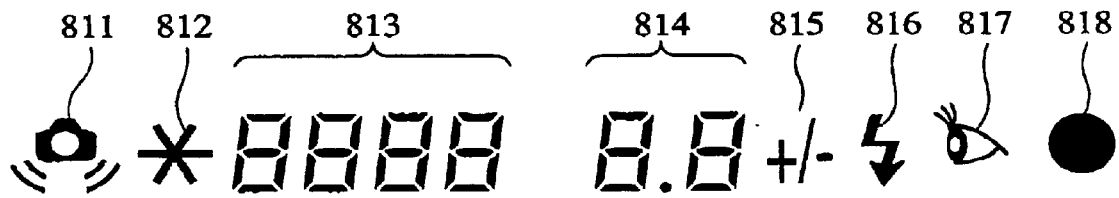

FIGS. 5A and 5B are views illustrating the contents of the full display segment of the display portion 308 outside the view field in FIG. 2, which shows displays on the monitoring LCD 202 and the intra-viewfinder LCD 24.

In FIG. 5A, reference numeral 801 designates a display portion for indicating that the camera is in the state of a sight line input mode. The sight line input mode can be set by pushing the mode button 204b to rotate the electronic dial 205, and the above-mentioned display portion 801 lights up by setting this mode.

As described above, the monitoring LCD 202 has a fixed segment display portion 202a for displaying a predetermined pattern, and has a seven-segment display portion 202b for displaying variable numeral values. The fixed segment displaying portion 202a includes the portion for displaying an AF operation and a photographing operation, such as the selection of a photographing mode, besides a known photographing mode display. On the other hand, the seven-segment display portion 202b for displaying variable numeral values comprises a four-digit seven-segment display portion 802 for displaying a shutter time value, a two-digit seven-segment display portion 803 for displaying an aperture value and a decimal point display portion 804, a limited number display portion 805 for displaying the number of films, and a one-digit seven-segment display portion 806.

In FIG. 5B, reference numeral 811 denotes a camera-shake warning mark, 812 denotes AE lock mark, and 813 and 814 each denote the same display portions as the above-described segment display portion 802 for displaying a shutter time value, and the segment display portion 803 for displaying an aperture value and decimal point display portion 804. Reference numeral 815 denotes an exposure correction setting mark, and 816 denotes stroboscope charge ending mark. Numeral 817 designates a display portion for indicating that the camera is in the state of a sight line input mode, and is the same as the display portion (display portion in FIG. 5A) for indicating that the camera is in the state of a sight line input mode. Numeral 818 designates an in-focus mark for displaying an in-focus state of the photographing lens 1.

Herein, the camera in accordance with this embodiment has the following three modes as focus detecting point selection modes for selecting at least one focus detecting point from among seven focus detecting points 301 to 307 shown in FIG. 2.

1) a "sight line input mode" wherein the rotational angle of the focal axis of a photographer's eyeball, and wherein focus detecting points are selected making use of the sight line detecting device for calculating the sight line of the photographer on the basis of the above-described rotational angle;

2) a "focus detecting point arbitrary selection mode" wherein the photographer can select arbitrary focus detecting points;

3) a "focus detecting point automatic selection mode" wherein the camera itself automatically executes extraction and selection with a predetermined algorithm (in this embodiment, the nearest point priority), on the basis of defocus information, which are overall focus detection results of the seven focus detecting points 301 to 307. Next, each of the above-described focus detecting point selection modes, the way of setting them, and the display therein will be described.

1) the "sight line input mode" can be set by pushing the mode button 204*a* to rotate the electronic dial 205, and by stopping the rotation once the display portion 801 shown in FIG. 5 and the sight line input mark 817 have been displayed.

2) The "focus detecting point arbitrary selection mode" can be set by pushing the focus detecting point selection mode button 206 shown in FIG. 4. By rotating the electronic dial 205 in this state, the currently lighted focus detecting point can be moved to an arbitrary focus detecting point.

Figure 6A:
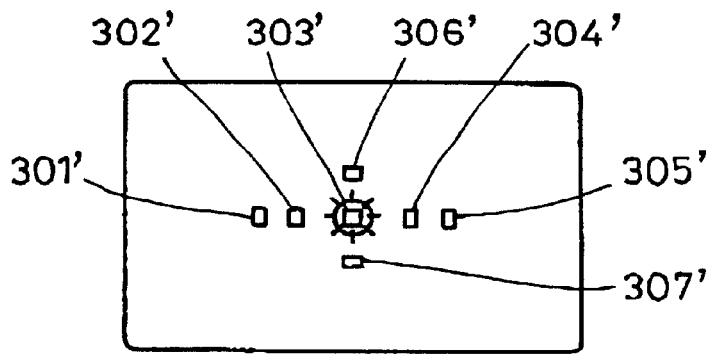
FIGS. 6A to 6D are views each explaining the focus detecting point selection mode in the camera in FIG. 1.
Figure 6B:
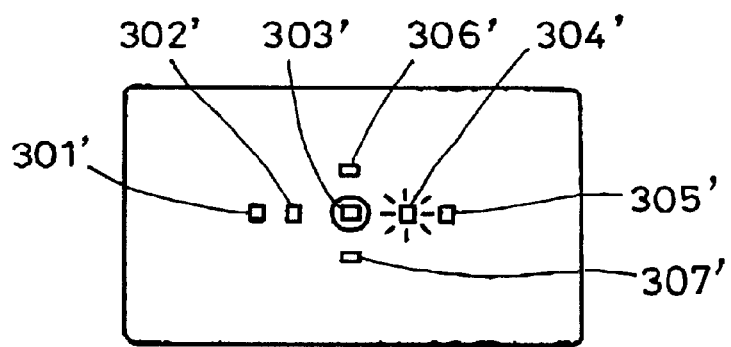
Figure 6C:
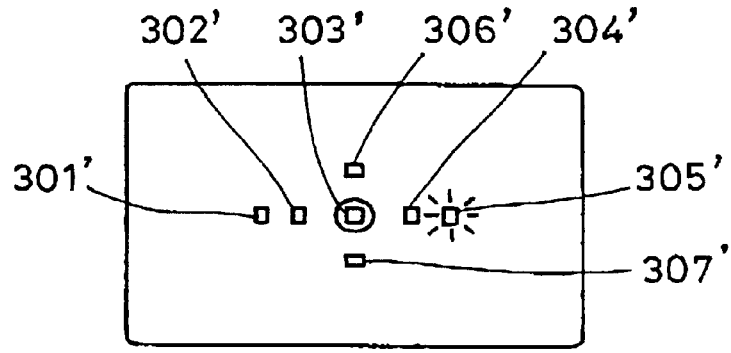

The selection of an arbitrary focus detecting point will be further detailed. For example, when the focus detecting point mark 303' is lighted up to display as shown in FIG. 6A, by rotating the electronic dial 205, the focus detecting point mark 303' move to the focus detecting point mark 304' as shown in FIG. 6B, in synchronization with the rotation. By further rotating the electronic dial 205, the display moves to the focus detecting point mark 304' as shown in FIG. 6B, the focus detecting point mark 305', as shown in FIG. 6C, the focus detecting point mark after moving is lighted up to display, thereby the photographer can recognize the focus detecting point selected by himself or herself. Also, by rotating backward the electronic dial 205, the focus detecting point mark 302' or 301' can be selected. Furthermore, for example, in the state wherein the focus detecting point mark 304' is displayed as in FIG. 6B, by pushing a button (not shown), the focus detecting point mark 306' can be selected, and by again pushing a button (not shown), the focus detecting point mark 307' can be selected.

Figure 6D:
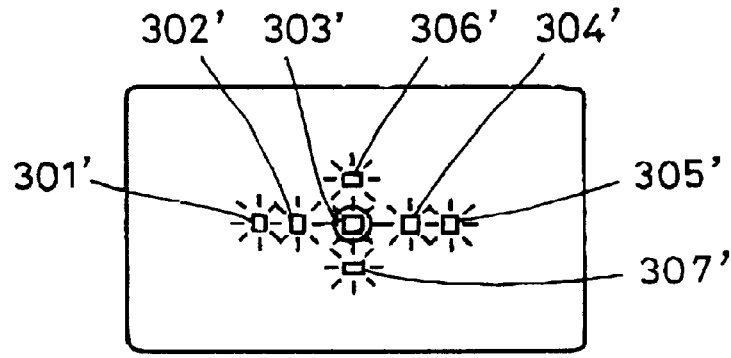

3) In the state shown in FIG. 6C, when the electronic dial 205 is further rotated in the same direction, all of focus detecting point marks 301' to 307' simultaneously lights for a predetermined time as shown in FIG. 6D, and the focus detecting point selection mode becomes the "focus detecting point automatic selection mode" wherein the camera itself automatically selects focus detecting points, for example, at the nearest points, on the basis of defocus information obtained at each of the focus detecting points 301 to 307. Thereby, the photographer can recognize that the focus detecting point selection mode is switches to the "focus detecting point automatic selection mode", from the simultaneous lighting up of all focus detecting point marks 301' to 307' as shown in FIG. 6D.

Figure 7B:
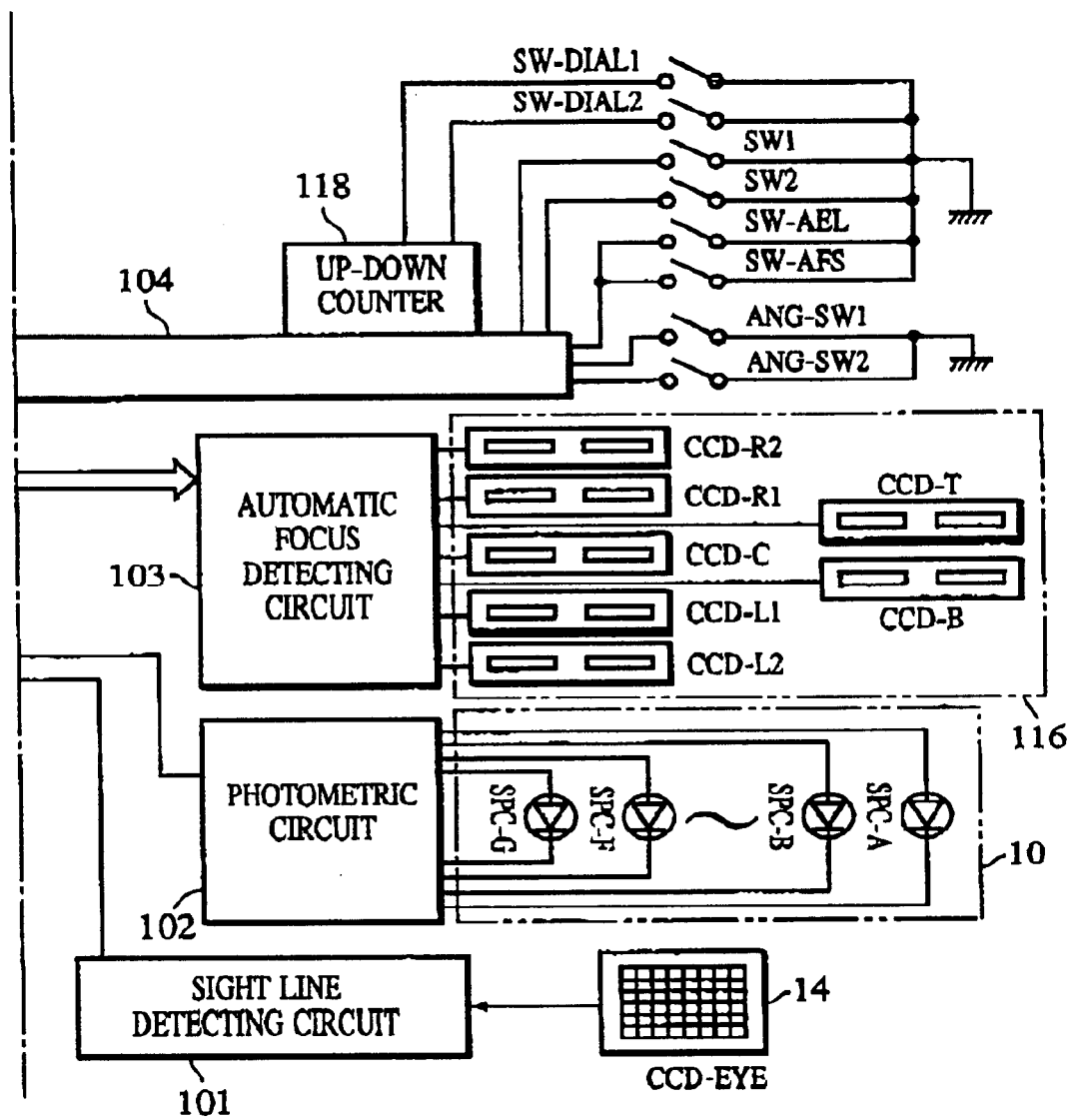

FIG. 7 is a block diagram showing a main section of the electric circuit built into the camera with the above construction. The same portions as those shown in each of the above figures are given the same reference numerals.

Connected to the central processing unit (hereinafter abbreviated as CPU) 100 of a microcomputer incorporated into the camera body, are a sight lie detecting circuit 101, a photometric circuit 102, an automatic focus detecting circuit 103, a signal input control circuit 104, an LCD driving circuit 105, a Led driving circuit 106 for backlight, an IRED driving circuit 107 for driving eight IREDs, i.e. IRED 1 to IRED 8 which correspond to 13*a* to 13*g* in FIG. 1, a shutter control circuit, and a motor control circuit 109. Also, in a focus adjusting circuit 37 and a diaphragm driving circuit 111 disposed in the photographing lens, the transmission of signals are performed via the mount contacts 38 shown in FIG. 1.

The CPU 100 has a RAM (not shown) incorporated therein, and has a function of storing the personal difference correcting information in the RAM. Setting the mode of the camera to the above-described calibration mode allows the acquisition of the personal difference correcting information for correcting personal difference in the sight line. Also, the calibration data and a calibration operation can be brought into an "OFF" state by the electronic dial 205.

With respect to the calibration data, multiple setting can be set. Specifically, the calibration data are effective when it is set by making a distinction among persons using a camera, or making a distinction between the cases where the observation conditions are different even if the persons using a camera is one and the same person, for example, between the case where the camera user wears eyeglasses and the case where the user does not, or between the case where the user employs dioptic lens and the case where the user does not.

As will be described later, the calibration number selected at this time is stored in an EEPROM 100*a* as calibration number (1, 2, 3 . . . , or 0).

In this embodiment, in the calibration data stored in one calibration number, calibration data at the normal posture and the vertical posture of a camera are stored as will be described later, and further, each of the above-described calibration data is separately stored depending on the number of cornea reflection images and the configuration thereof.

The sight line detecting circuit 101 A/D-converts an eyeball image output of the CCD 14 (CCD-EYE) and transmits the obtained image information to the CPU 100. The CPU 100 extracts from this image information some characteristic points of the eye-ball image which are necessary for the known sight line detection in accordance with a predetermined algorithm. The CPU 100 then calculates the visual line of the photographer from the positions of these characteristic points. The CPU 100, the sight line detecting circuit 101 and the CCD 14 jointly form one element of the sight line detecting device.

The photometric circuit 102 amplifies the outputs of the photometric sensor 10. Then, the photometric circuit 102 logarithmically compresses and A/D-converts the amplified outputs, and transmits them to the CPU 100 as luminance information from each portion of the photometric sensor 10. The photometric sensor 10 comprises seven photo diodes SPC-A to SPC-G which measure light at the area corresponding to each of the focus detecting point marks 301' to 307' (i.e., focus detecting points 301 to 307) shown in FIG. 2.

The line sensor 116 included in the focus detecting device 6 is a known CCD line sensor (corresponding to line sensor 6*f*), which is composed of seven sets of line sensors CCD-C, CCD-R1, CCD-R2, CCD-L, CCD-L2, CCD-T, and CCD-B which are disposed at the positions correspond to the above-described seven focus detecting point marks 301' to 307', respectively. These seven types of line sensor becomes the focus detecting points 301 to 307 likewise shown in FIG. 2.

The automatic focus detecting circuit 103, likewise included in the focus detecting device 6, A/D-converts voltages obtained from the line sensor 116 and transmits the obtained voltage data to the CPU 100.

A photometric switch SW1 is arranged to be turned on in response to the first stroke of operation on the release button 201 to cause light measuring, AF and sight line detecting operations to start. A release switch SW2 is arranged to be turned on in response to the second stroke of operation on the release button 201. ANG-SW1 and ANG-SW2 denote posture detecting switches constituting the posture detecting device 27, SW-AEL denotes a lock switch which is turned on by a pushing the AE lock button 203, and SW-AFS denotes a focus detecting point selection mode switch which is turned on by pushing the focus detecting point selection mode button 206. SW-DIAL1 and SW-DIAL2 designates dial switches provided within the above-described electronic dial 205 to count the rotating click amount of the electronic dial 205 and to have their signals inputted to an up-down counter 118 of the signal input control circuit 104. The mode buttons 204a, 204b and 204c shown in FIG. 2 are not shown in FIG. 7.

Once the signal indicating the states of the above-described switches have been inputted to the signal input circuit 104, the signals are each transmitted to the CPU 100 by a data bus.

The above-described LCD driving circuit 105 is a known circuits which drives the intra-viewfinder LCD 23 and the monitoring LCD 202 to make displays. The LCD driving circuit 105 causes both the intra-viewfinder LCD 23 and the monitoring LCD 202 to simultaneously display an aperture value, a shutter time value, a set photographing mode, etc., in accordance with signals from the CPU 100. The above-described LED driving circuit 106 controls lighting-up and blinking actions of the LED 21 (LED-L1, LED-L2, LED-C, LED-R1, LED-R2, LED-T, and LED-B). Also, at lighting, the LED driving circuit 106 varies the lighting luminance in accordance with the signal calculated by the CPU on the basis of the signal from the photometric circuit 102, and thereby facilitating recognizing the displays of the above-described focus detecting point marks in response to the brightness within the viewfinder.

The above-described IRED driving circuit 107 is adapted to drive IREDs in accordance with the CPU 100. In the case of a photographer with naked eyes, i.e., wearing no eyeglasses, the four IREDs, i.e., IRED 13a, IRED 13b, IRED 13e, and IRED 13f on the inner periphery side shown in FIG. 4 are subjected to a simultaneous lighting control. On the other hand, in the case of a photographer wearing eyeglasses, the four IREDs, i.e., IRED 13c, IRED 13d, IRED 13g, and IRED 13h on the outer periphery side are subjected to a simultaneous lighting control.

The shutter control circuit 108 controls a magnet MG-1 which causes the front curtain to travel when it is energized and another magnet MG-2 which causes the rear curtain to travel when it is energized, and causes a photosensitive member 5 to be exposed to a predetermined quantity of light. The above-described motor control circuit 109 controls a motor M1 which winds a film, and another motor M2 which charges the main mirror 2 and the shutter 4, and which rewinds the film. The shutter control circuit 108 and the motor control circuit 109 thus enable the camera to perform a series of shutter release operations.

The grip(G)-and-battery-chamber 208 which is indicated by dotted lines in FIG. 3, and which is situated at the right hand portion of the photographer holding a camera, contains a battery 113. The battery 113 is mechanically and electrically connected to the terminals P-GND and VBAT of the connector 114 and supplies electric power to a camera body power-supply system 115.

Terminals other than the terminals P-GND and VBAT of the connector 114 and the terminal of a connector 117 are ones used when accessories are mounted. With the grip-and-battery-chamber unit 112 mounted on the camera body, the grip-and-battery-chamber unit 112 has not any corresponding terminals to be connected to these terminals, and thereby these terminals are in an unconnected state. A switch 119 is arranged to detect that the grip-and-battery-chamber unit 112 or accessories are mounted. With either of them mounted on the camera body, the switch 119 is disconnected from a terminal D-GND, i.e., comes into an "OFF" position.

Next, a sequence of operations of the camera will be described with reference the flowcharts in FIGS. 8 and 9.

In a step #100, the power switch shown in FIG. 4 is turned to "on" position by the photographer, the camera is energized, and the CPU 100 starts operations from #100 onward.

First, at the step #101, the CPU 100 checks the focus detecting point selection mode, and if the selected mode is the sight detection input mode, the flow proceeds to a step #102. On the other hand, if the selected mode is the focus detecting point arbitrary selection mode, the flow proceed to a step #101a, and if the selected mode is the focus detecting point automatic selection mode, the flow proceeds to a step #101b. When the focus detecting point automatic selection mode is selected, the sight line information is not used, but a subroutine is executed wherein the camera itself selects focus detecting points with a predetermined algorithm, on the basis of the focus detection results at all focus detecting points corresponding the seven focus detecting point marks 301' to 307' shown in FIG. 2. Herein, since the light of sight line input mark 818 (see FIG. 5B) in the intra-viewfinder LCD 24 is put out by the LCD driving circuit 105, the photographer can recognizes, by the display portion 308 outside viewfinder screen (see FIG. 2), that the camera executes no sight line detection. Even when the above-described focus detecting point arbitrary selection mode is selected, the light of the sight line input mark 818 is likewise put out.

On verifying, by the steps #101 and 102, that the selected mode is the sight line input mode, the CPU 100 carries an operation forward to a step #103, and resets variables used for sight line detection other than the sight-line calibration data stored in the EEPROM 100a, thereby setting the camera in a predetermined state. In the ensuing step #104, the flow of operation stands by until the release button 201 is pushed in to turn on the switch SW1.

Thereafter, when the switch SW1 is turned on, the flow proceeds from the step #4 to a step #5. At the step #5, the CPU 100 checks which calibration (CAL) data to be used when executing sight line detection, using the sight line detecting circuit 101.

If the calibration data of the checked calibration data number remain unchanged as initial values, sight line detection is performed using the initial values. One calibration data number stores a plurality of calibration data in accordance with the postures. If calibration data in accordance with some posture are not found in one calibration data number, sight line detection is performed using the calibration data in accordance with another posture. For example, if the calibration data at the normal posture along exist when the camera is held at the vertical posture, sight line detection is performed using the calibration data at the normal posture.

On detecting that the sight line calibration data corresponding to the above-described calibration data number have been set and that the data have been inputted, the CPU 100 carries an flow forward to a step #106. At this step, the CPU 100 executes sight line detection using the sight line detecting circuit 101. On the basis of the calibration data selected so as to correspond to the number of Purkinje images, the CPU 100 executes calculation so as to transform the coordinates of the sight line detected in the sight line detecting circuit 101 to the coordinates of the gazing point on the focusing plate 7 as the gazing point of a photographer (details thereof will be described later with reference to FIG. 12).

At this time, the CPU 100 brings the photographer into a recognition that the camera is currently performing sight line detection by means of the display portion 308 outside the viewfinder screen, by causing the sight line input mark 817 (see FIG. 5B) in the intra-viewfinder LCD 24 to be lighted up via the LCD driving circuit 105. Also, the CPU 100 causes the seven segment display portion 813 to display the set shutter time value, and causes the seven segment display portion 814 to display the set aperture value.

At the next step #107, depending on the area at which gazing point area the above-described gazing point coordinates exists, corresponding gazing point is selected from among the seven focus detecting points in FIG. 2, and at the ensuing step #108, the selected focus detecting points (strictly, focus detecting point marks) are caused to light up to make a display.

Here, correlation between the gazing point area and the focus detecting point will be described with reference to FIGS. 10 and 11.

Figure 10:
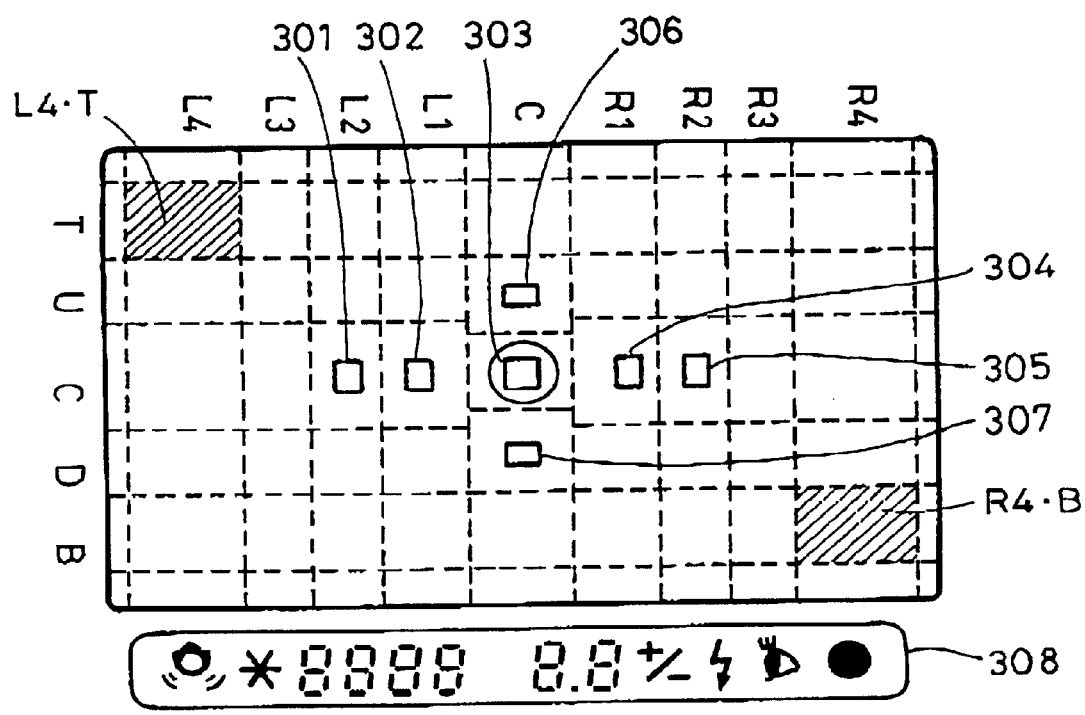
FIG. 10 is a view explaining the gazing point area within the viewfinder view field in the camera in FIG. 1.

In FIG. 10, in the CCD 14, which is a portion of the sight line detecting device, the positions on the focusing plate 7 and the position on the view finder observation screen 300, through which the position on the focusing plate 7 is observed, has a correlation. As shown in FIG. 10, on the focusing plate and on the view finder observation screen 300, a plurality of gazing points areas defined by nine columns of L4, L3, L2, L1, C, R1, R2, R3, and R4, and five rows of T, U, C, D, and B is constructed. Each of the gazing points areas are represented by a column name and a row name. For example, the left top area is named as L4•T, and the right bottom area is named as R4•B.

Figure 11:
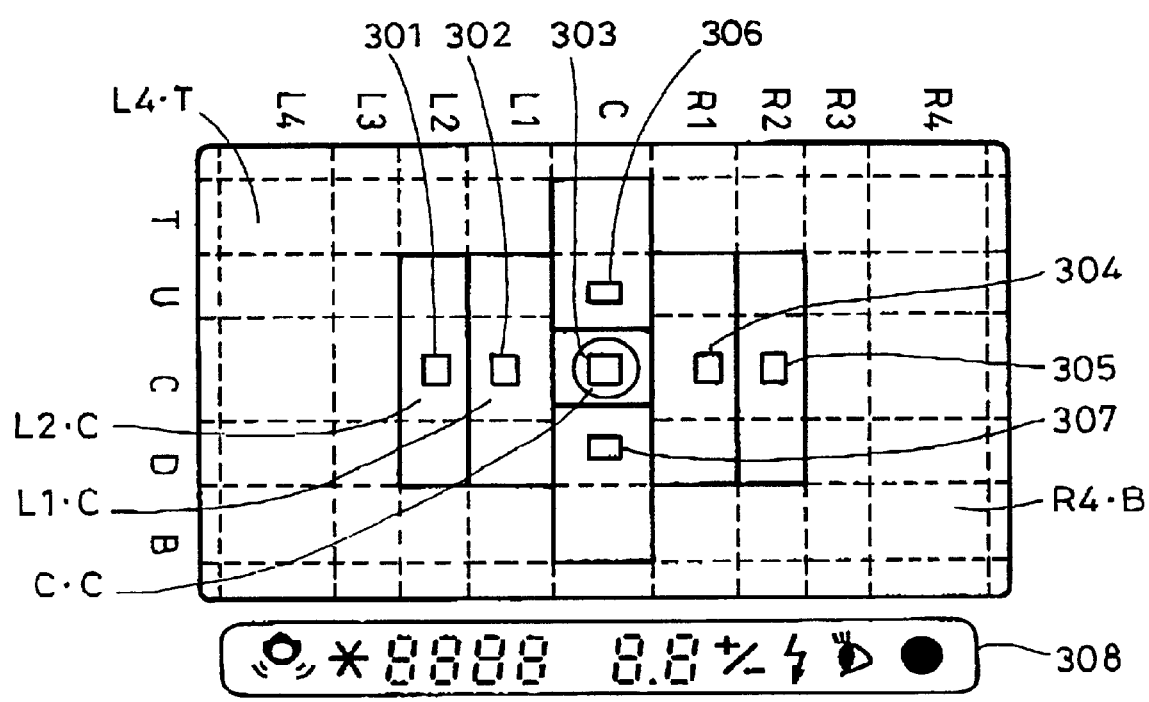
FIG. 11 is a view explaining the relationship between the selection of the focus detecting points and the gazing point area within the viewfinder view field in the camera in FIG. 1.

In FIG. 11, there exists seven gazing point area groups surrounded by thick frames, and focus detecting points contained in the gazing point area groups having gazing point coordinates, and surrounded by the thick frames, are selected. If no gazing point coordinates are found in the gazing point area groups surrounded by the thick frames, the sight line detection is inhibited, and the current mode is moved to the focus detecting point automatic selection mode (a step #101b in FIG. 8).

Returning to FIG. 8, if the photographer recognizes that these focus detecting points are incorrect, on seeing the above-described displayed focus detecting points, and detaches his or her finger from the release button 201 to turn off the switch SW1, the flow returns from a step #109 to the step #104, and stands by until the switch SW1 is again turned on.

Figure 9:
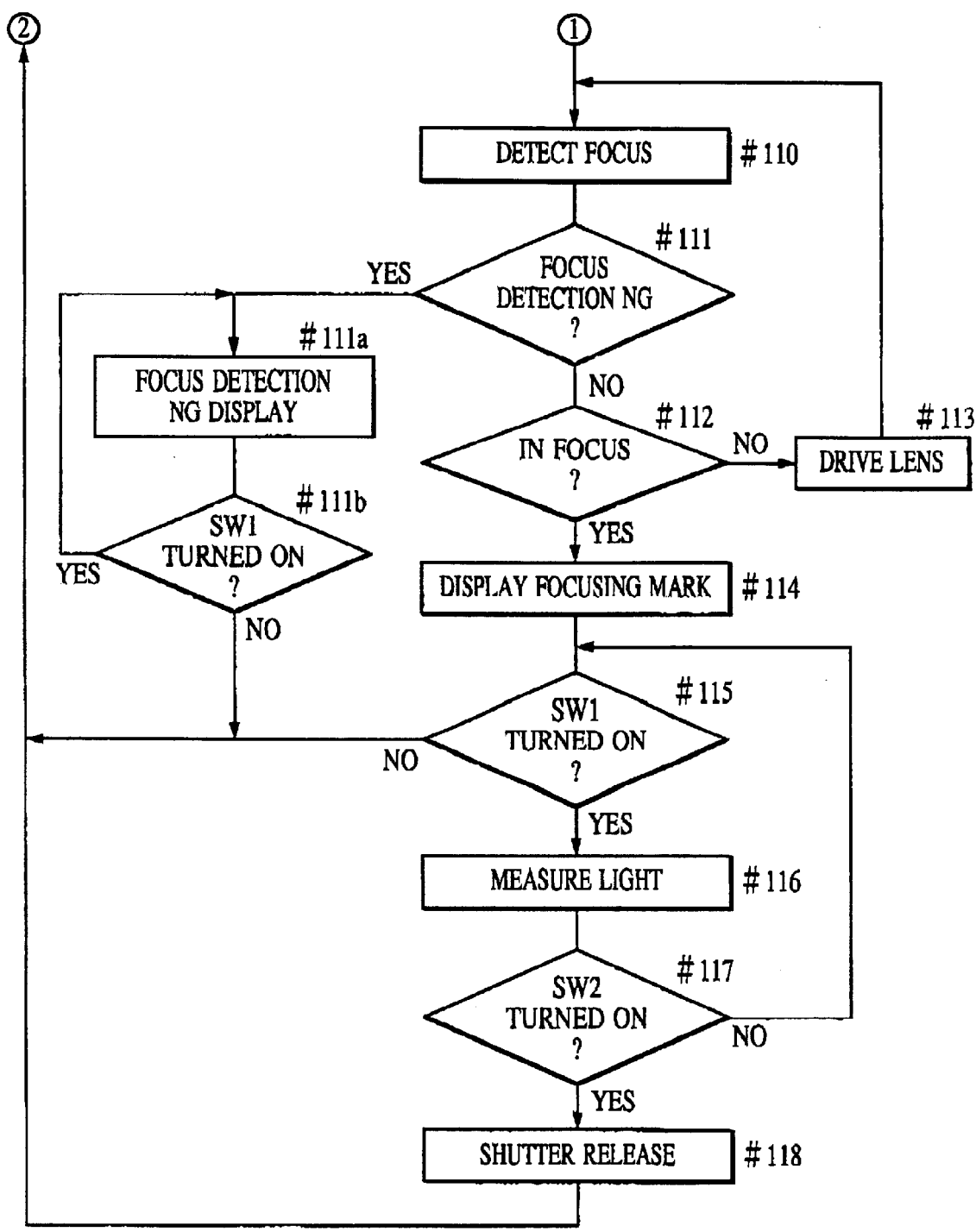
FIG. 9 is a flowchart illustrating a continuation of the operations shown in FIG. 8.

On the other hand, if the photographer recognizes that the focus detecting points are correctly lighted and displayed, on seeing the above-described display, and continues to push the release button 201 to keep on having the switch SW1 in an on-state, the flow proceeds from a step #109 to the step #110 in FIG. 9. At the step #110, a focus detecting operation at the selected focus detecting points is performed using the automatic focus detecting circuit 103. At the next step #111, a decision is made whether the focus detection at the step #110 was inexecutable (NG) or not. If the focus detecting operation at the step #110 is decided to be NG, the flow proceeds to a step #111a, and the in-focus mark 818 in FIG. 5B is blinked as the display of focus detection NG. At the next step #111b, the state of the switch SW1 is checked. If SW1 remains an on-state, the flow returns to the step #111b, and the above-described blinking action is carried on. If SW1 is in an off-state, the flow returns to the step #104 in FIG. 8, and stands by until the switch SW1 is again turned on.

If a focus detection is executable, the CPU 100 carries an operation forward from the step #111 to a step #112, and makes a decision whether or not the current focus adjusting state coincides with the focus detection results obtained by the focus detecting points selected using a predetermined algorithm, in other words, a decision whether the photographing lens is in focus or not. If the photographing lens is not in focus, the flow proceeds to a step #113, and a signal is transmitted to the lens focus adjusting circuit 110 to cause the photographing lens 1 to be driven to a predetermined extent. Thereafter, the flow returns to the step #110, and a focus detection is performed. Hereinafter, the same processes are repeated.

At the above-described step #112, if the photographing lens 1 is in focus, the flow proceed to a step #114. The CPU 100 transmits a signal to the LCD driving circuit 105 to cause it to light up the in-focus mark 818 in the intra-viewfinder LCD 24, and simultaneously transmits a signal to the IRED driving circuit 107 to cause the focus detecting point marks corresponding to the in-focus focus detecting points to be displayed (in-focus display). At the next step #115, if the photographer recognizes that these focus detecting point are incorrect, in seeing the above-described in-focus display, and detaches his or her finger from the release button 201 to turn off the switch SW1, the flow returns to the step #104 in FIG. 8, and stands by until the switch SW1 is again turned on.

On the other hand, if the photographer recognizes that the focus detecting points are correct, on seeing the above-described in-focus display, and continue to turn on the witch SW1, the flow proceeds to the step #116, and transmits a signal to the photometric circuit 102 to cause it to measure light. Herein, a photometric area is selected from among the seven areas from photometric areas SPC-A to SPC-G including in-focus focus detecting points, and a weighted exposure value is determined by calculation.

In this embodiment, a know photometric calculation with weighting is performed around the photometric area including the above-described selected focus detecting points, in the seven areas from photometric areas SPC-A to SPC-G. As a result of this calculation, an aperture value (for example, 5.6) is displayed using the display portions 803 and 804 of the monitoring LCD 202.

At the next step #117, it is determined whether the switch SW1 is in an on-state or not, with the release button 201 pushed in. If the switch SW1 is in an off-state, the flow returns to the step #115, and a check of the state of the switch SW1 is made. On the other hand, if the switch SW1 is in an on-state, the flow proceeds to a step #118, and the CPU transmits a signal to the shutter control circuit 108, the motor control circuit 109, and the diaphragm driving circuit 111 to execute known shutter release operation.

Specifically, firstly by energizing a magnet MG2, the main mirror 2 is moved upward, and the aperture of the diaphragm 31 is stopped down. Thereafter, a magnet MG1 is energized to open the front curtain of the shutter 4. An aperture value of the diaphragm 31 and a speed of the shutter 4 are determined according to an exposure value detected by the photometric circuit 102 and a sensitivity value of a film 5, which is a photosensitive member. After the lapse of a predetermined shutter time, e.g., 1/250 sec, the rear curtain of the shutter 4 is closed by energizing the magnet MG2. On completion of exposure of the film 5, the magnet MG2 is again energized to move the mirror 2 downward and to charge the shutter 4. Then, the magnet MG1 is also energized and a frame advance of the film is performed, thereby finishing a sequence of shutter release operations.

After the foregoing operations, the flow returns to the step #104 in FIG. 8, and comes into a state of waiting for the switch SW1 to be again turned on.

During a sequence of operations other than the shutter release operation (step #118) shown in FIGS. 8 and 9, once the mode buttons 204b and 204c shown in FIG. 3 and others have been pushed simultaneously, the CPU 100 detects that the camera has been set to the sight line calibration mode wherein personal difference correction data (sight-line correction coefficients) are collected through the signal input circuit 104, and temporarily stops and action of the camera. Thereupon, the CPU 100 transmits a signal to the sight line detecting circuit 101 to set the camera to a state wherein the sight line calibration (step #119 in FIG. 8) is executable. The calibration method for the sight lines will be described later.

Next, the sight line detection operation executed at the step #106 or the step #119 will be explained with reference to FIGS. 12 and 13.

First, at a step #201, the CPU 100 makes a decision whether the detection of sight line in the photographing mode through the sight line detecting circuit 101 should be performed, or the detection of sight line in the sight line calibration (CAL) mode should be performed. Simultaneously, the CPU 100 detects that the camera has been set to which calibration number described later. In the case of the sight line detection in the photographing mode, the flow proceeds to a step #202, and firstly, which posture the camera takes is detected from the posture detecting circuit 27 via the signal input circuit 104. Specifically, on the basis of the outputs of the switches ANG-SW1 and ANG-SW2 in FIG. 4, the CPS 100 detects which posture the camera takes among the three postures, i.e., the normal posture, the vertical posture with the grip upside wherein the right hand of a photographer is situated upside, and the vertical posture with the grip downside wherein the right hand of a photographer is situated downside.

At the next step #203, information on the brightness circuit 102, and at the ensuing step #204, a selection of IREDs is made from among IRED 13a to IRED 13h, on the basis of the eyeglass information included in the previously detected posture information and calibration data. Specifically, if the camera is set at the normal posture, and the photographer does not wear eyeglasses, the IREDs 13a, 13b, 13e, and 13f which are close to the optical axis of the viewfinder, are selected. On the other hand, if the camera is set at the normal posture, and the photographer wears eyeglasses, the IREDs 13c, 13d, 13g, and 13h which are away from the optical axis of the viewfinder, are selected. In this case, since one portion of the illumination light reflected by the eyeglasses reaches the outside of the predetermined area on the CCD 14 on which the eyeball image is projected, this does not interfere with the analyzing of an eyeball image. The same goes for the case where the camera is set at the vertical posture.

The flow then proceeds to a step #205, and the accumulation time of the CCD (CCD-EYE) 14 and the illumination power of the IREDs may be set on the basis of the value determined from the eyeball image contrast obtained during the last sight-line detection operation. On setting the accumulation time of the CCD 14 and the illumination power of the IREDs, the flow proceeds to a step #206. At the step 206, the CPU 100 causes the IREDs to light up with a predetermined power through the IRED riving circuit 107, and also starts the accumulation of the CCD 14 through the sight line detecting circuit 101. The accumulation of the CCD 14 is finished in accordance with the previously set CCD accumulation time, and therewith the IREDs are put out.

At the next step #207, a decision is made whether the camera is in the sight-line calibration mode or not. If not, the flow proceeds to a step #208, and the read-out area of the CCD is set. Apart from the first sight-line detection after the power-supply of the camera body has been turned on, the read-out area of the CCD is set with reference to the CCD read-out area at the last sight-line detection. However, when the postures of the camera are varied, or when the presence/absence of eyeglasses is changed, the read-out area of the CCD 14 are set over the entire area thereof.

On completion of the setting of the CCD read-out area. The flow proceeds to a step 209, and the read-out of the CCD 14 is executed. Herein, in areas other than the read-out area, idle reading is conducted, and in fact the reading in skipped. The object of this is to speedily carry out the sight line detection. At the next step #210, after A/D converting the image output which has been read out from the CCD 14 by the sight line detecting circuit 101, the CPU 100 stores the converted image output in the EEPROM 100a, and also performs calculation for extracting each of the characteristic points of the eyeball image.

Figure 26A:
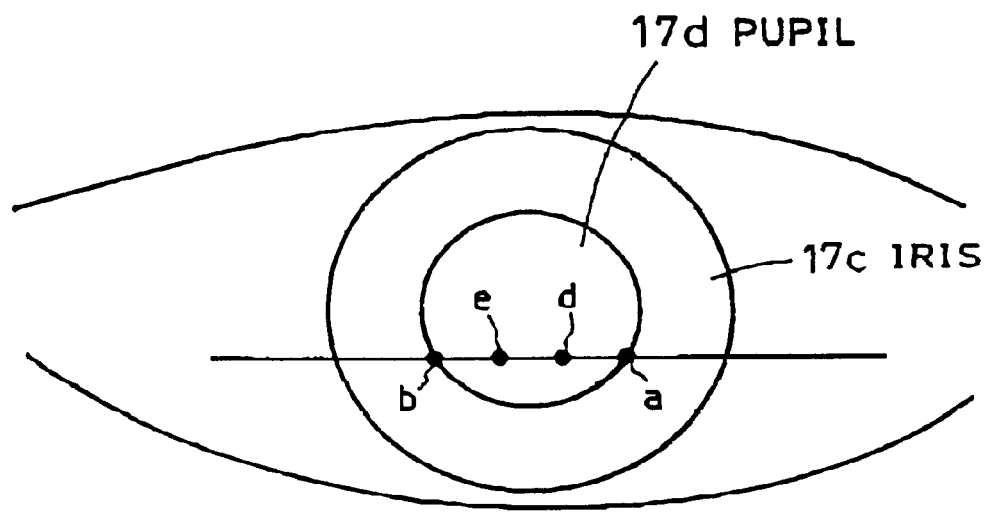
FIGS. 26A and 26B are each explanatory views for the eyeball image.
Figure 26B:
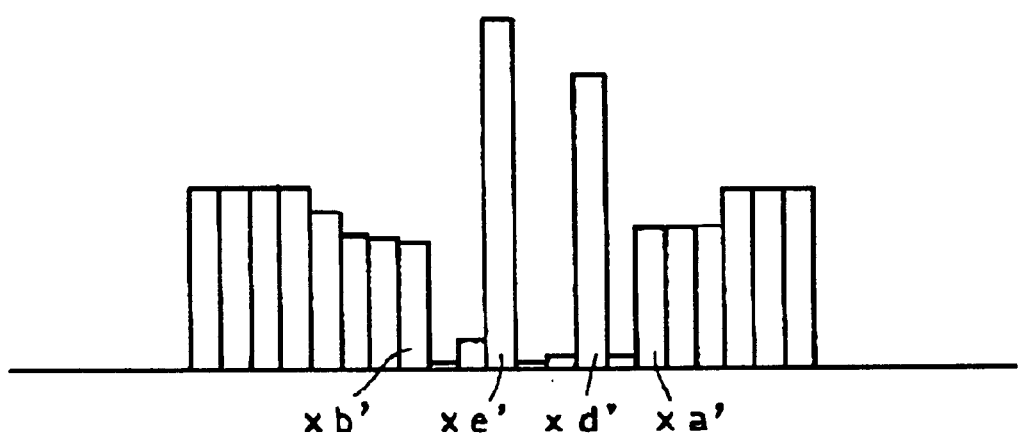
Figure 27:
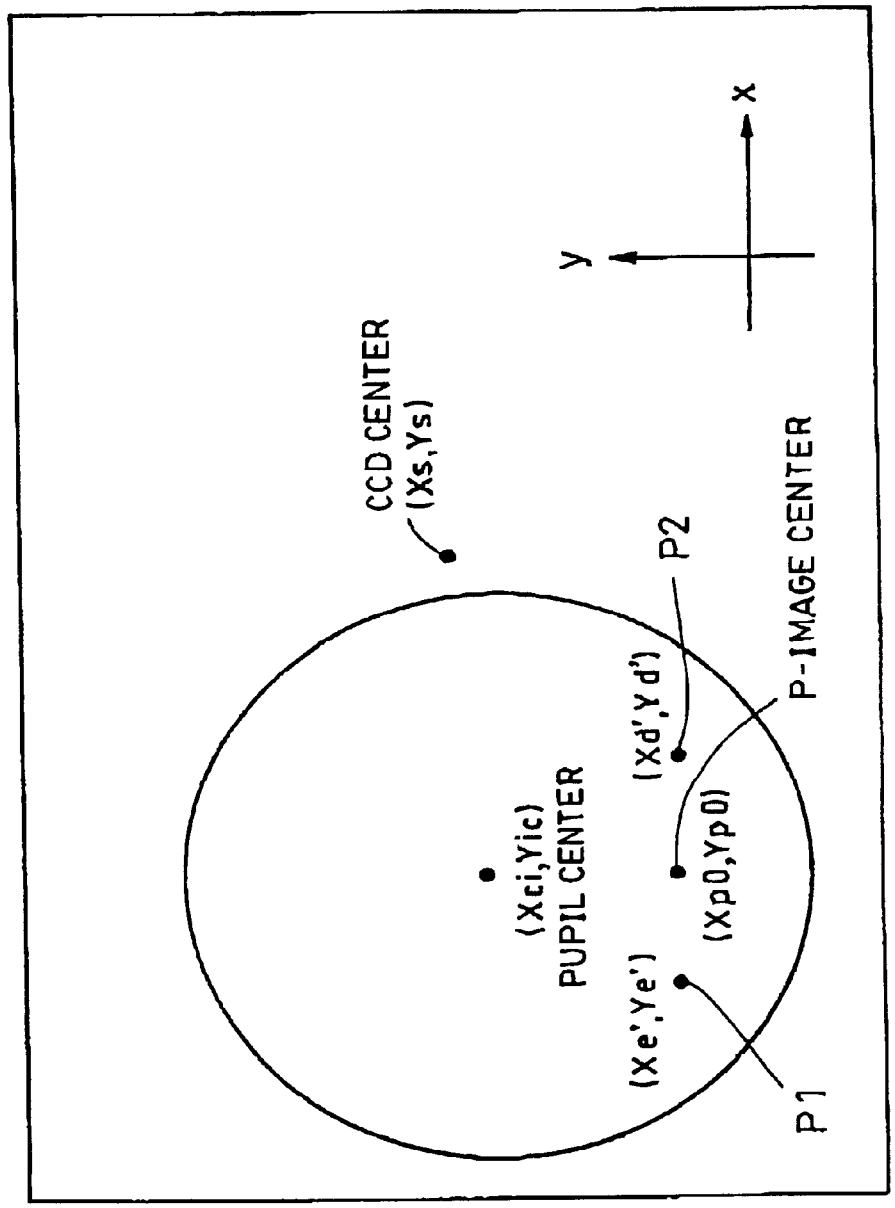
FIG. 27 is a view explaining the conventional eyeball image and configuration of Purkinje images.
Figure 28:
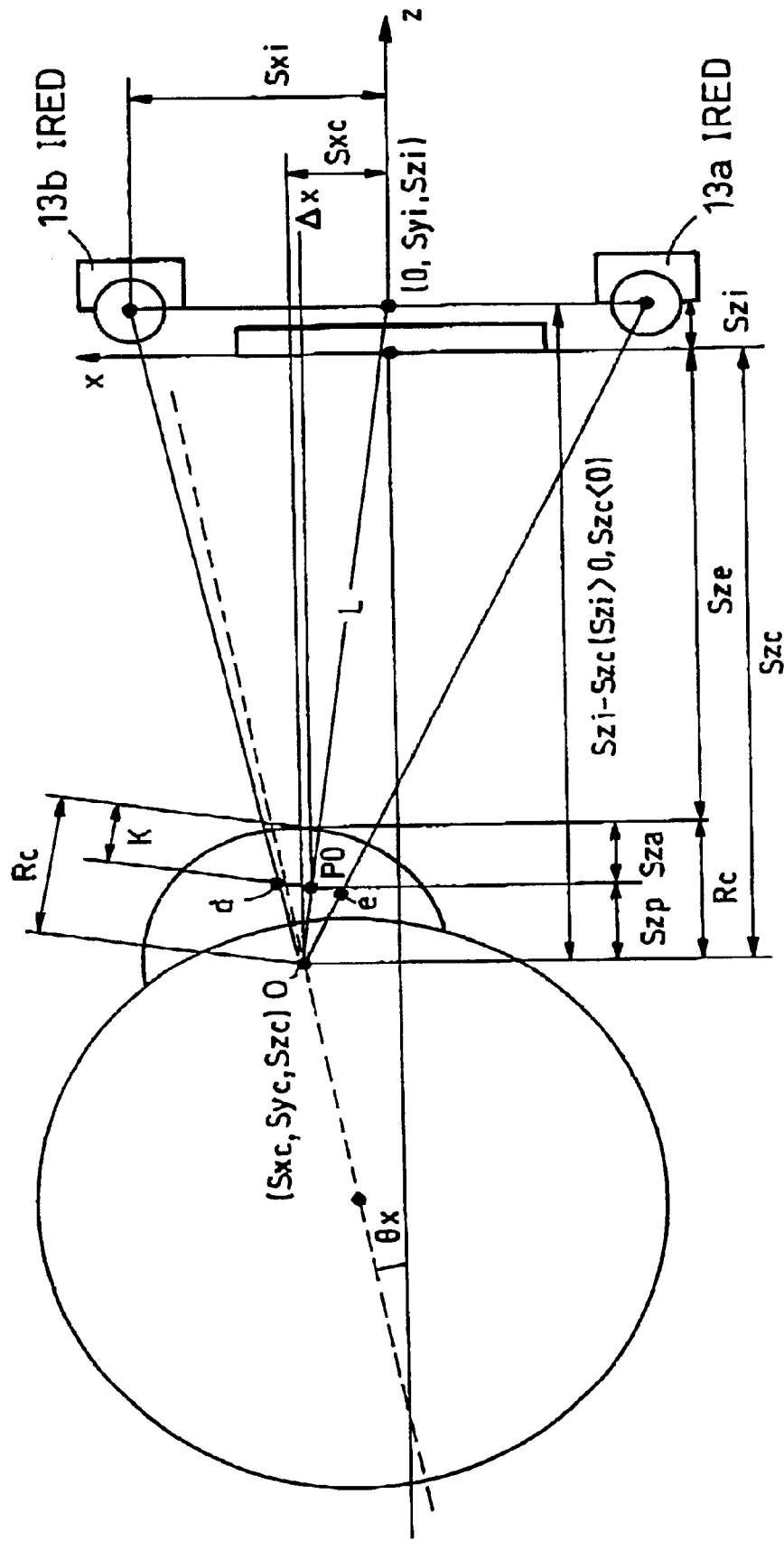
FIG. 28 is a view explaining the principle of the conventional sight line detection (x–Z plan)
Figure 29:
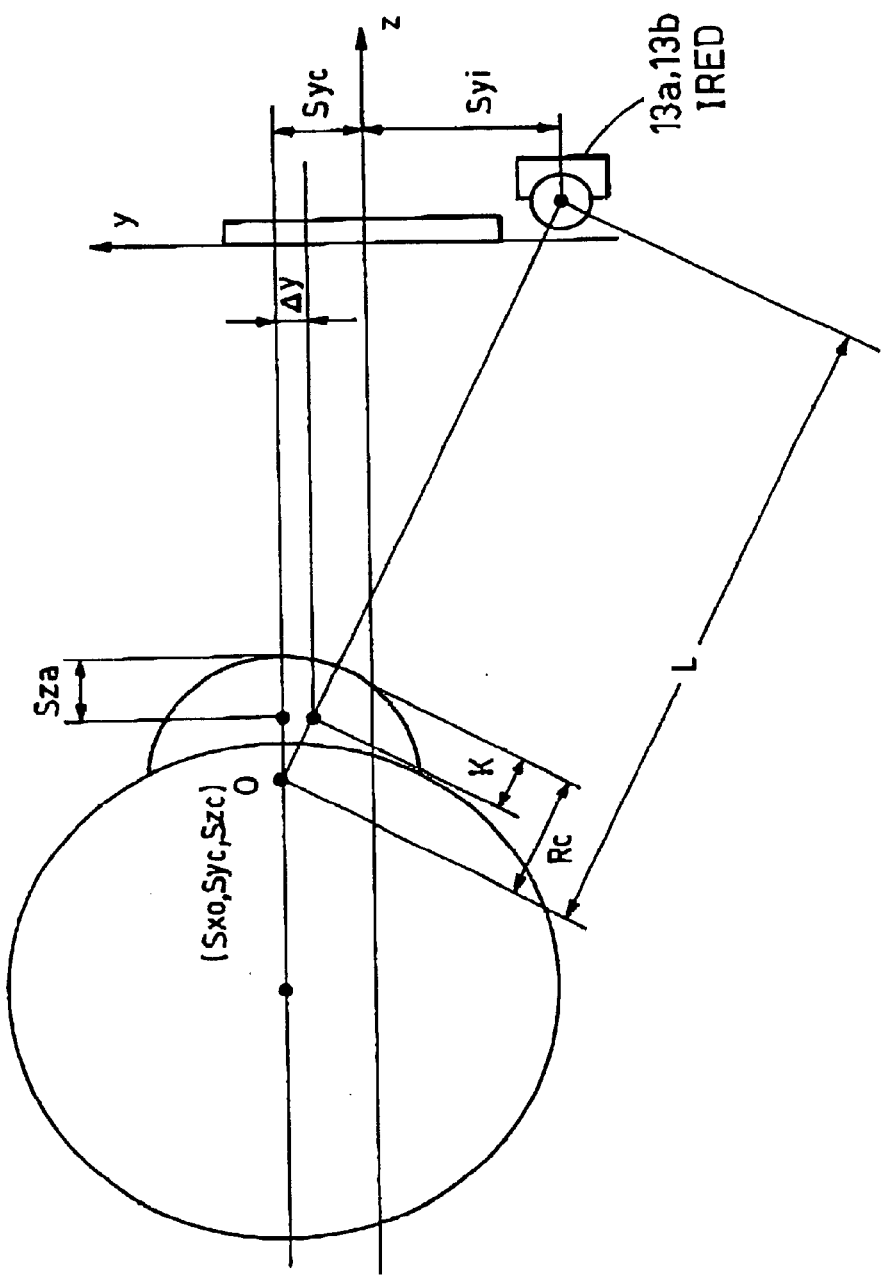
FIG. 29 is a view explaining the principle of the conventional sight line detection with two IREDs provided at the lower side (y–z plan)
Figure 30:
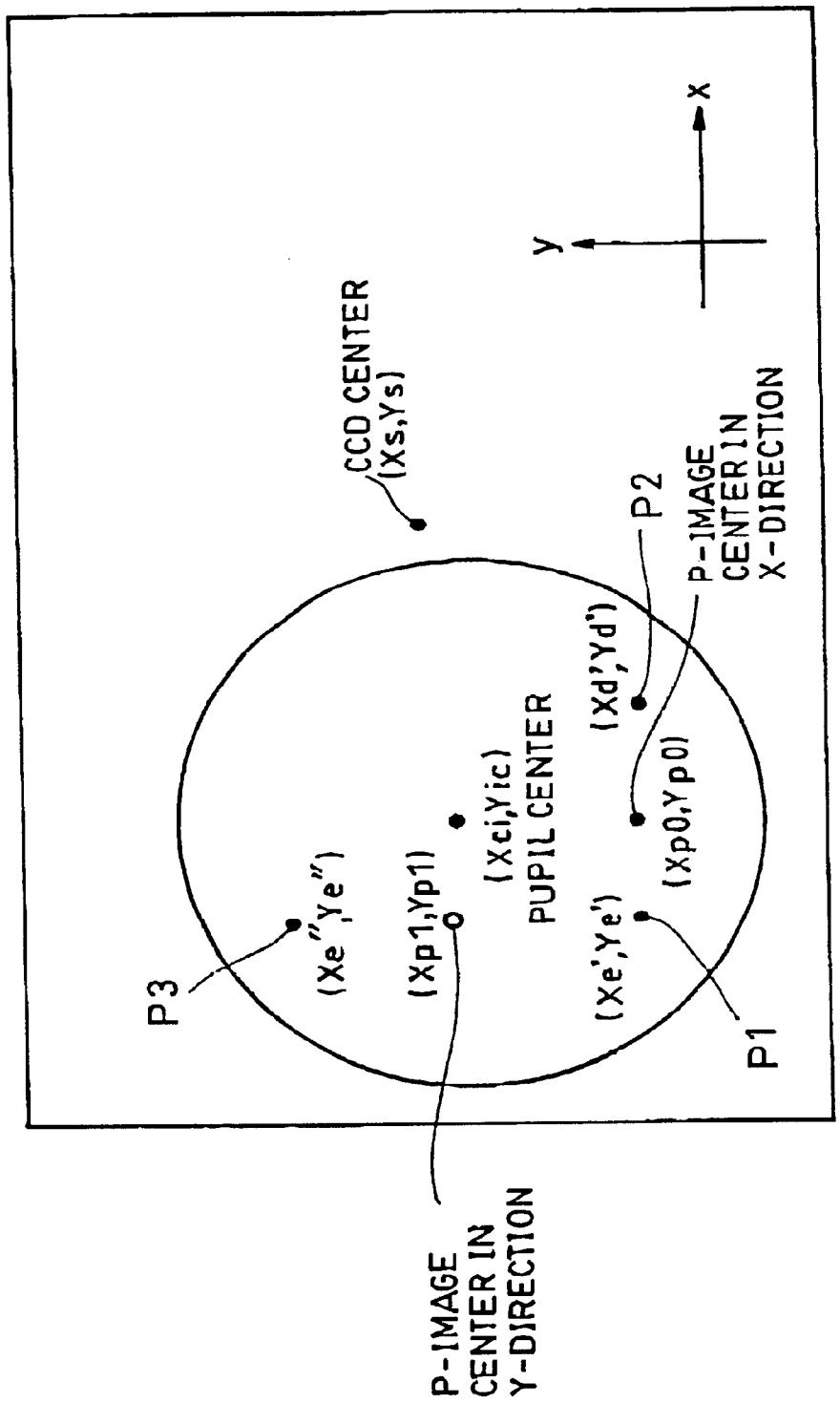
FIG. 30 is a view explaining the conventional eyeball image with three IREDs provided and the configuration of Purkinje images.
Figure 31:
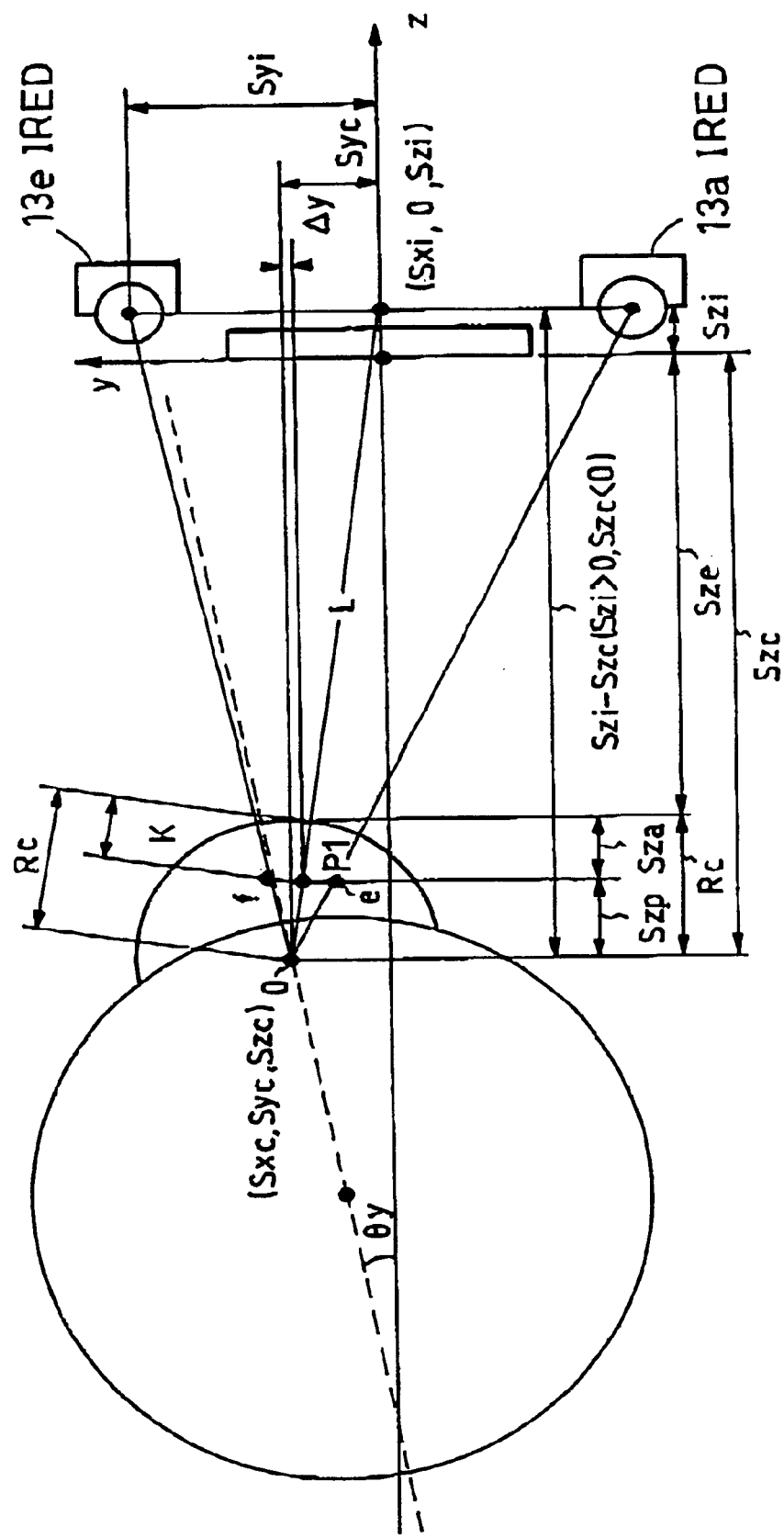
FIG. 31 is a view explaining the principle of the conventional sight line detection with three IREDs provided (y–z plan)
Figure 32:
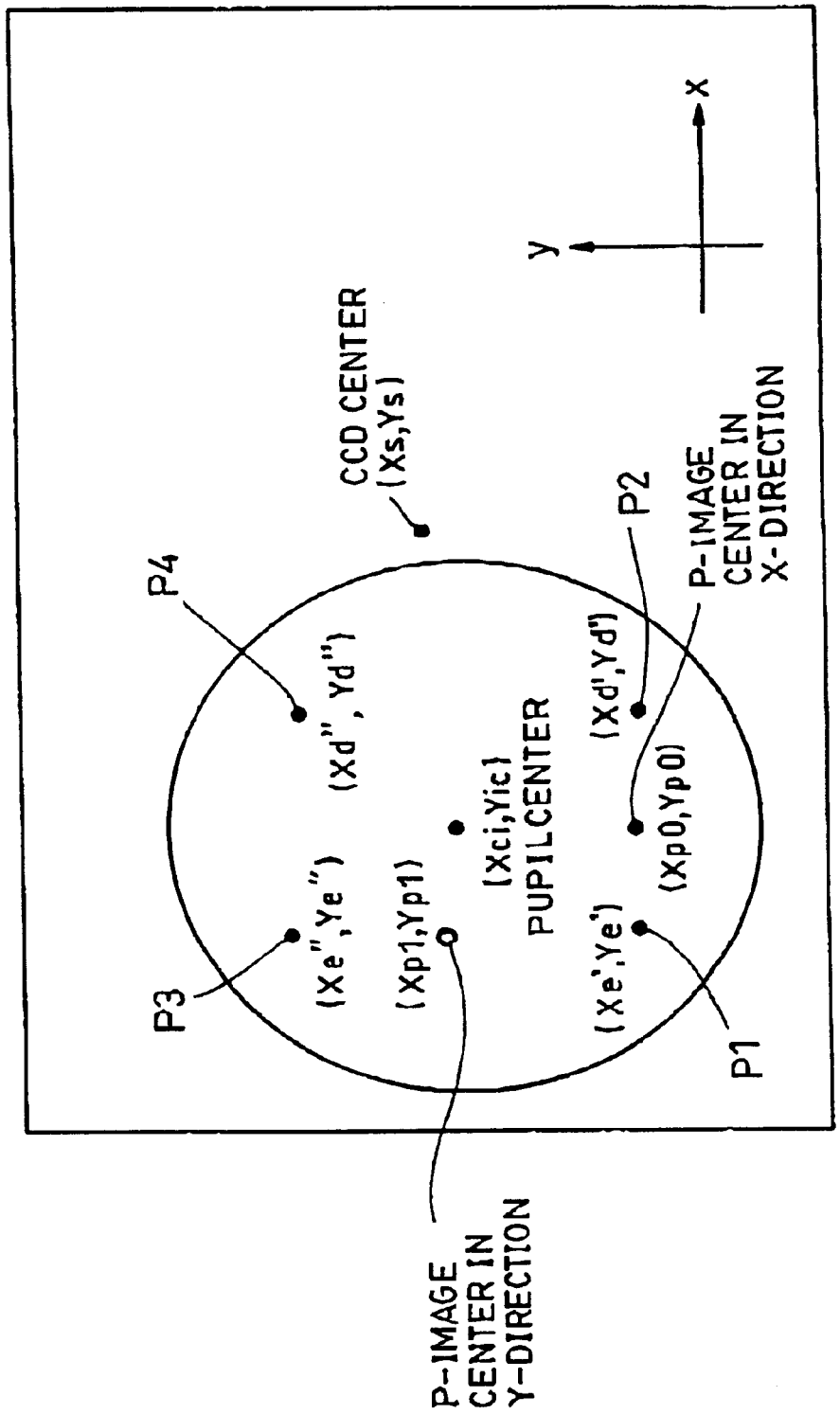
FIG. 32 is a view explaining the conventional eyeball image with four IREDs provided and the configuration of Purkinje images.

Specifically, as the positions of the four Purkinje images P1, P2, P3, and P4, which are the set of four IREDs used for illuminating the eyeball, and which are principally the virtual images of the IREDs in FIG. 32, the CPU 100 detects the P1(Xe', Ye'), P2(Xd', Yd'), P3(Xe", Ye"), and P4(Xd", Yd"). Since the Purkinje image appears as bright points with a high light intensity (see FIG. 26B), it can be detected by setting a predetermined threshold value for the light intensity, and by judging an image signal exceeding the above-mentioned threshold value as a Purkinje image. In addition, the center position (Xic, Yic) of the pupil is calculated by detecting a plurality of boundary points between the pupil 17d and iris 17c (see FIG. 26A), and by conducting a least square approximation of a circle on the basis of each of the boundary points. Here, the pupil diameter rp is also calculated.

The CPU 100 not only performs an analysis of the eyeball, but also detects the contrast thereof, and executes the resetting of the accumulation time of the CCD 14 on the basis of the extent of the contrast. Furthermore, the CPU 100 sets the read-out area of the CCD 14 based on the positions of the Purkinje images and the pupil. Herein, the read-out area of the CCD 14 is set so that the detected pupil is included in this read-out area, and that the entire pupil is in a detectable range even if the position of the pupil changes to a predetermined extend. Of course, the dimension of the read-out area is smaller than that of the iris.

The read-out area of the CCD 14 is set to have a rectangular shape. The coordinates of two diagonal points of the rectangular shape is set to be the read-out area of the CCD 14, and stored in the sight line circuit 101. A decision of the reliability of the calculated Purkinje images and the pupil center, is made of the basis of the contrast of the eyeball image and the dimension of the pupil.

In principle, it is possible to achieve the four Purkinje images, which are virtual images of the IREDs in FIG. 32.

However, when performing the sight line detection for a photographer, an illumination source is blocked by the photographer's upper eyelid and eye lash depending on the observation conditions and the personal differences, and hence, the Purkinje images corresponding to IREDs can not necessarily obtained. Accordingly, at the next step #211, the states of the Purkinje images is discriminated based on the number of Purkinje images and the configuration thereof. In this embodiment, in the case where any Purkinje image cannot be obtained, and in the case where only one Purkinje image can be obtained, sight line detection is inexecutable, or the accuracy of sight line detection is significantly impaired. Therefore, the CPU 100 returns an operation to the step #201, on deciding that there is no sight line reliability.

Here, the states of the number of Purkinje images and the configuration thereof will be described with reference to FIG. 14.

In FIG. 14, in the "Number of P-images" (in the figure, Purkinje image is abbreviated as P-image), for example, the state wherein four Purkinje images exist are named as "Four P-image state", and the state wherein no Purkinje image exist are named as "No P-image state". The figure shows from the "Four P-image state" up to the "No P-image state". Also, the "P-image state view" illustrates the existence state of the four Purkinje images P1, P2, P3, and P4 which will be later shown in FIG. 32, and the respective coordinates of the P-images are P1(Xe', Ye'), P2(Xd', Yd'), P3(Xe", Ye"), and P4(Xd", Yd"). These P-image coordinates are used for calculation of Xpo and Ypo.

As shown in FIG. 14, there are sixteen ways of configurations of Purkinje images obtained by the four IRED illumination of the photographer's eyeball.

In this embodiment, the case of a photographer with naked eyes, i.e., one wearing no eyeglasses is taken as an example. After extracting the Purkinje images P1(Xe', Ye') and P2(Xd', Yd') corresponding to the lower-side IREDs 13a and 13b, the distance between the two Purkinje images is calculated based on the positions thereof (step #210 in FIG. 12).

Next, from the Purkinje image P1(Xe', Ye') of the IRED 13a, characteristic points estimated as an Purkinje image existing in a predetermined range with a value obtained by multiplying the above-described distance between the Purkinje image by a predetermined coefficient, are detected as the Purkinje image P3(Xe", Ye") corresponding to the IRED 13e. Likewise, from the Purkinje image P2(Xd', Yd') corresponding to the IRED 13b, the P4(Xd", Yd") corresponding to the IRED 13f is detected.

More specifically, the detection of the Purkinje images P3(Xe", Ye") and P4(Xd", Yd") is performed with reference to the Purkinje images P1(Xe', Ye'), P2(Xd', Yd') corresponding to the lower-side IREDS 13a and 13b. The object of this is to speed up the detection of the Purkinje images P1, P2, P3, and P4, and to prevent the possibility that the illumination source be blocked by the photographer's upper eyelid and upper eyelash, depending on the observation conditions and the personal differences. That is, the Purkinje images P1 and P2 corresponding to the lower-side IREDs 13a and 13b (or 13c and 13d) has a very high probability of occurrence, whereas the Purkinje images P3 and P4 corresponding to the upper-side IREDs 13e and 13f (or 13g and 13n) has a very high probability of non-occurrence, depending on the photographer and the photographing conditions.

In this manner, in this embodiment, at the above-described step #211, the four ways of numbers and configurations of Purkinje-images indicated by the thick frames in FIG. 14 are discriminated with reference to the positions of the two Purkinje images effective for sight line detection, and existing on lower side on the y-axis. Herein, if the CPU 100 makes a decision that the state of the Purkinje-images of interest do not correspond to any of these four ways of Purkinje-image numbers and configurations indicated by the thick frames in FIG. 14, the CPU 100 returns the operation from the step #211 to the step #201, judging it as being devoid of sight line reliability, as described above. Thereafter, the flow again proceeds to the step #201, and if a decision is made that there is no sight line reliability, the camera comes into the focus detecting point automatic selection mode (step #101b in FIG. 8), which is not shown.

In FIG. 14, the used calibration data are ones obtained in the calibration which will described later. In this embodiment, with respect to the four ways of numbers and configurations of Purkinje-image, calibration data on three P-images of more and calibration data on two P-images are employed.

After finishing the analysis of the eyeball, if the discrimination of the P-image state is executable, the flow proceeds to a step #212. At this step, a decision is made whether the eyeglass information among calibration data is correct or not, on the basis of the combination of the calculated distance between the Purkinje images and lighted IREDs, by means of the sight line detecting circuit 101 doubling as calibration data checking means. The object of this is to deal with a photographer who sometime wears eyeglasses and sometime does not.

Now, an explanation will be given of the case where the eyeglass information among calibration data is set, for example, to wear eyeglasses. When IREDs 13c, 13d, 13g and 13h are lighted up among the IREDs shown in FIG. 4, if the distance between the Purkinje images is larger than a predetermined one, the Conversely, if the distance between the Purkinje images is smaller than a predetermined one, the photographer is recognized as an eyeglass non-wearer, or a contact-lens wearer, and a decision is made that the eyeglass information is incorrect.

On determining that the eyeglass information a incorrect, the CPU 100 carries an operation forward to a step #219, and performs a change of the eyeglass information. Thereafter, the CPU 100 returns to the step #294 in FIG. 12, and after again selecting IREDs, executes sight line detection. However, when changing the eyeglass information, the eyeglass information stored in the EEPROM 100a of the CPU 100 is not changed.

On determining that the eyeglass information is correct, the CPU 100 carries an operation forward from the step #212 to a step #213. At this step, the CPU calculates the distance between the camera eyepiece lens 11 and the photographers's eyeball 15 on the basis of the distance between the Purkinje images, and further calculates the image-forming magnification $\beta$ of the eyeball projected on the CCD 14 on the basis of the distance between the camera eyepiece lens 11 and the photographer's eyeball 15.

Figure 19:
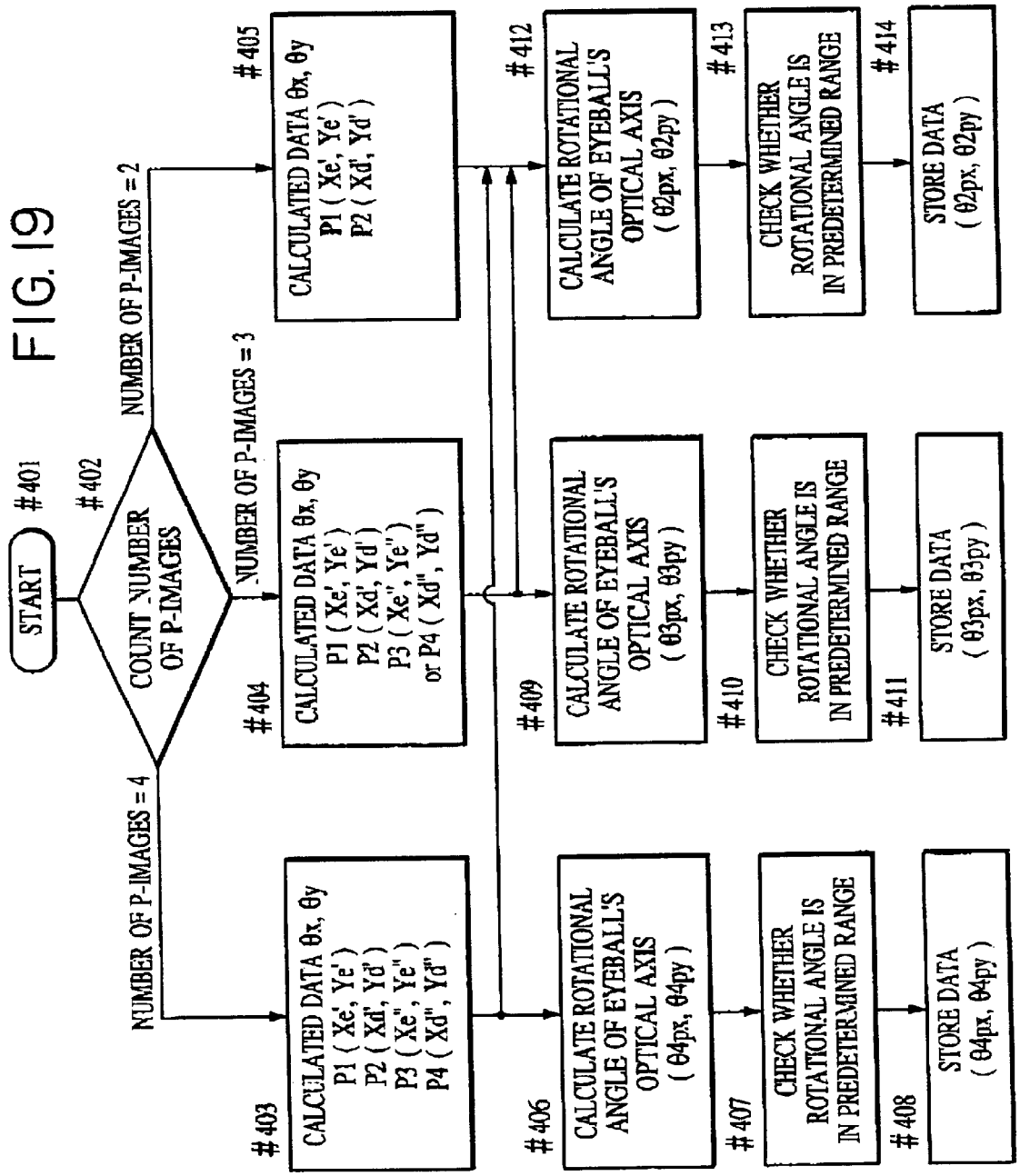
FIG. 19 is a flowchart illustrating the portion associated with the calculation of θx and θy, and the data storage in the above-described calibration operation.
Figure 20:
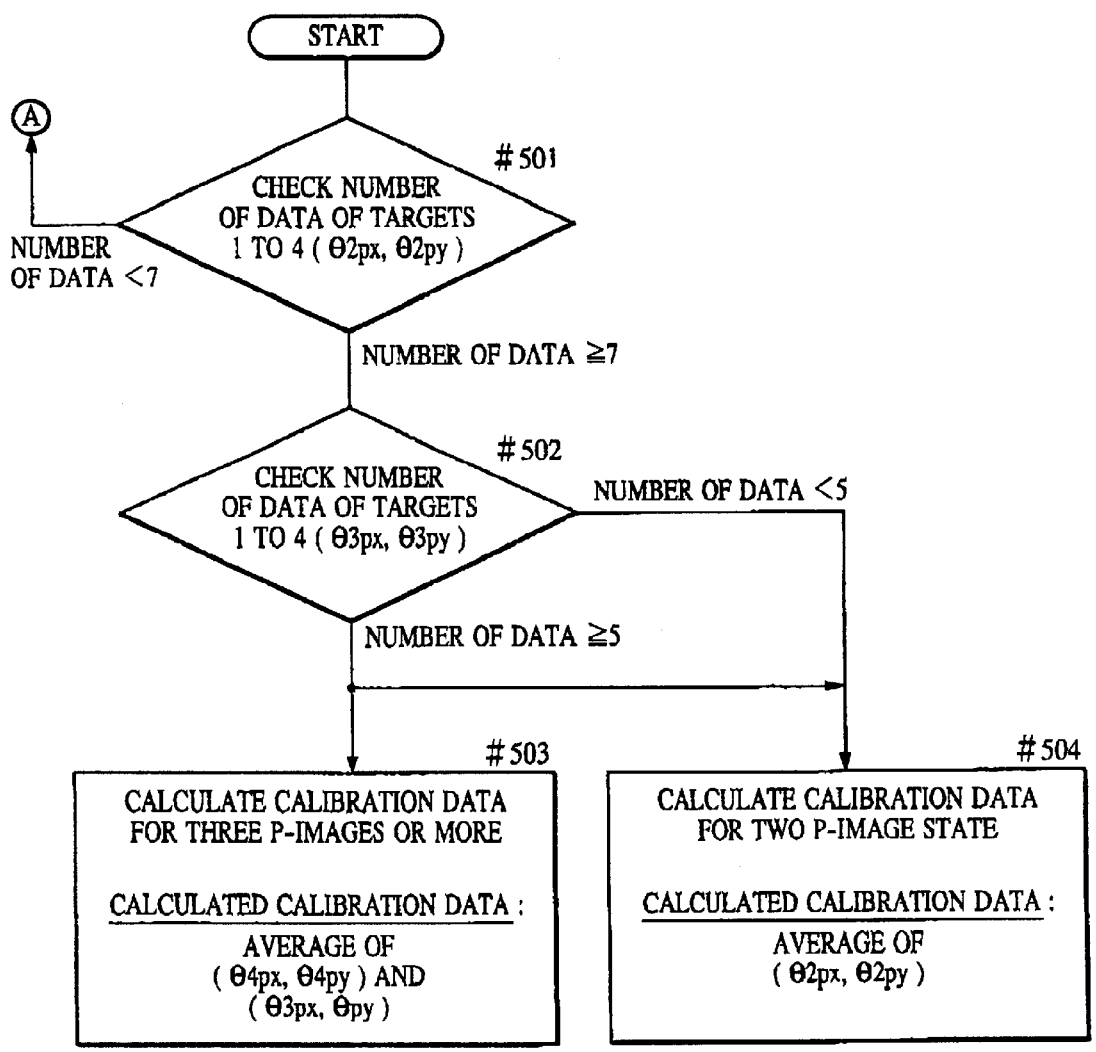
FIG. 20 is a flowchart illustrating the portion associated with the calculation of the above-described calibration operation.
Figure 21A:
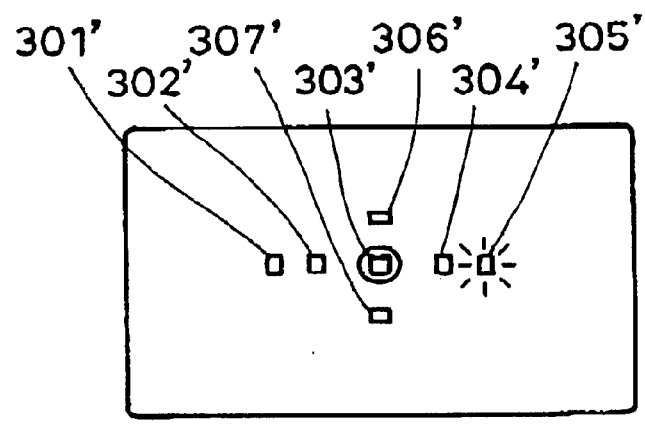
FIGS. 21A to 21D are views each explaining targets during the above-described calibration operation.
Figure 21B:
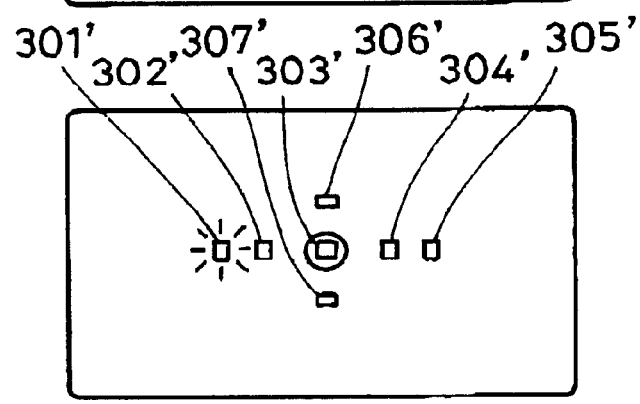
Figure 21C:
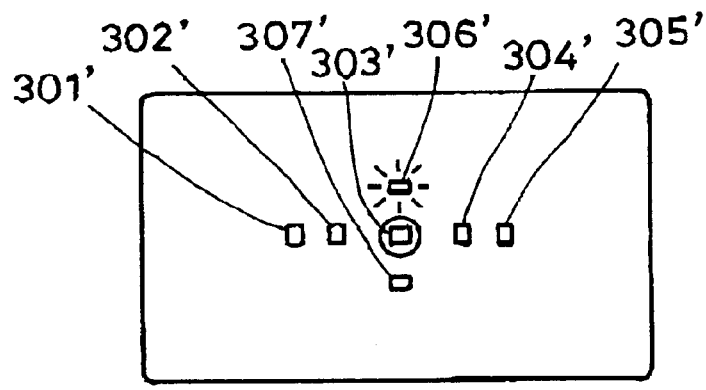
Figure 21D:
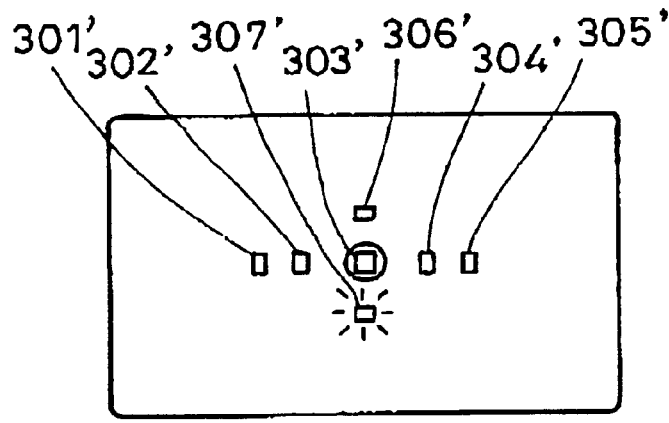

At the next step #214, a check is made whether the camera is in the calibration mode or not, and if so, data processing shown later in FIG. 19 is performed. If the camera is not in the calibration mode, the flow proceeds to a step #216, and the rotational angles $\theta x$ and $\theta y$ of the eyeball's optical axis are calculated.

Specifically, the rotational angles $\theta x$ and $\theta y$ of the optical axis of the eyeball 15 is obtained by modifying the above equations (3) and (4) as follows:

$$\theta x \approx \text{ARCSIN}\left[\{(Xp0-\delta x)=Xic\}/\beta/\text{Loc}\right] \tag{17}$$

$$\theta y \approx \text{ARCSIN}\left[\{(Yp0-\delta y)=Yic\}/\beta/\text{Loc}\right] \tag{18}$$

Here, with regard to Xp0 and Yp0, calculating methods thereof are different from each other, depending on the configurations of the Purkinje images in FIG. 14.

In the above equations, δx and δy are correction terms for correcting the center positions of the two Purkinje images in the equations (10), (12), and (16). δx values are determined by the equation (10), while δy are determined by the equation (12) if the Purkinje image state of interest is in a two P-image state, and determined by the equation (16) if it is in a three or four P-image state. The difference between determining methods for δy is whether Ypo which can be treated similarly to the case of δx, and which can be directly calculable in the y-axis direction, is present or not.

For example, in the case of the two P-image state in FIG. 14, the coordinates of the midpoint P0 between the Purkinje images P1(Xe', Ye') and P2(Xd', Yd') are used as (Xp0, Yp0).

In the case of the three P-image state, let the midpoint of the x-coordinates of the Purkinje images P1(Xe', Ye') and P2(Xd', Yd') be Xpo, and let the midpoint of the y-coordinates of the Purkinje images P1(Xe', Ye'), and P3(Ye", Ye"), or the Purkinje images P2(Xd', Yd') and P4(Xd", Yd") be Ypo.

In the case of the four P-image state, the coordinates of the midpoint P0 of the Purkinje images P1(Xe', Ye') and P2(Xd', Yd'), P3(Ye", Ye"), and 4(Xd", Yd") are used as (Xpo, Ypo).

In this manner, the discrimination of the Purkinje image states (step #211) is required for calculating the rotational angel θx and θx of the optical axis of the eyeball.

On determining the rotational angles θx and θx of the optical axis of the photographer's eyeball, the CPU carries on operation forward to a step #216, and determines the sight line position (x, y) on the focusing plate 7 from the following equations (5) and (6).

$$X[mm] = m \times ax \times (\theta x + bx) \qquad (5)$$

$$Y[mm] = m \times ay \times (\theta y + by) \qquad (6)$$

Here, ax, ay, bx, and by each denote calibration coefficients for correcting personal differences, and ax and ay among these are calibration data.

In this embodiment, in the discrimination of the Purkinje image state (step #211), as shown in FIG. 14, the P-image states are discriminated among three states: four P-image state, three P-image state, and two P-image state, and the rotational angles θx and θx of the optical axis of the eyeball are calculated in accordance with the calculation method thereof. Then, in the case of the four P-images and the three P-image states among the above-described three P-image states, previously obtained calibration data on three P-images or more (described later) are selected, while, in the case of the two P-image stages among the above-described three P-image states, previously obtained calibration data on two P-images (described later) are selected, and thereby the positions (x, y) of sight line on the focusing plate 7 are determined. This also indicates that it is necessary to use in combination the discrimination of the state of Purkinje image states (step #211) and means for selecting and using two different calibration data.

Here, coefficients bx and by, which corresponds to correction quantity for disagreement between the optical axis of the eyeball and the visual axis in the horizontal direction (x-axis direction) and the vertical direction (Y-axis direction), respectively, are expressed as $$bx = kx \times (rp - rx) + box \qquad (19)$$

$$by = ky \times (rp - rx) + boy \qquad (20)$$

Each of the coefficients bx and by is thus a function of the pupil diameter rp. Here, rx is a constant, and kx, ky, box, and boy are calibration data. The method for determine calibration data on sight line will be described later.

Depending on the reliability of the calibration data on sight line, the reliability of the calculated sight line coordinates are changed using the above-described equations (5), (6), (19), and (20). Once the sight line coordinates on the focusing plate 7 have been determined, the flow proceeds to a step #217, and after setting a flag which indicates that the sight line detection has once been performed, returns to the main routine via a step #218.

Figure 12:
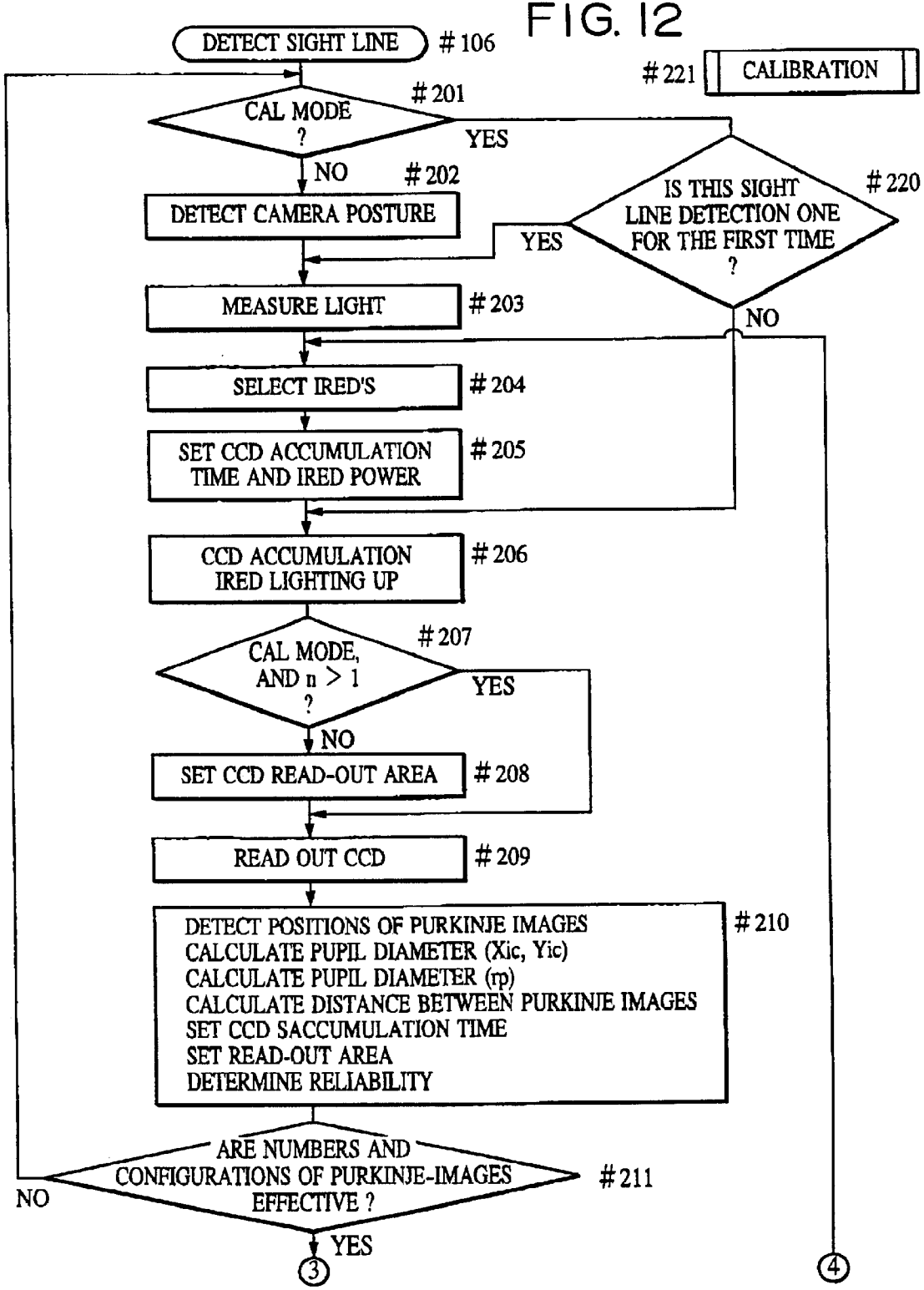
FIG. 12 is a flowchart illustrating a portion of the sight line detecting operations of the camera in FIG. 1.
Figure 13:
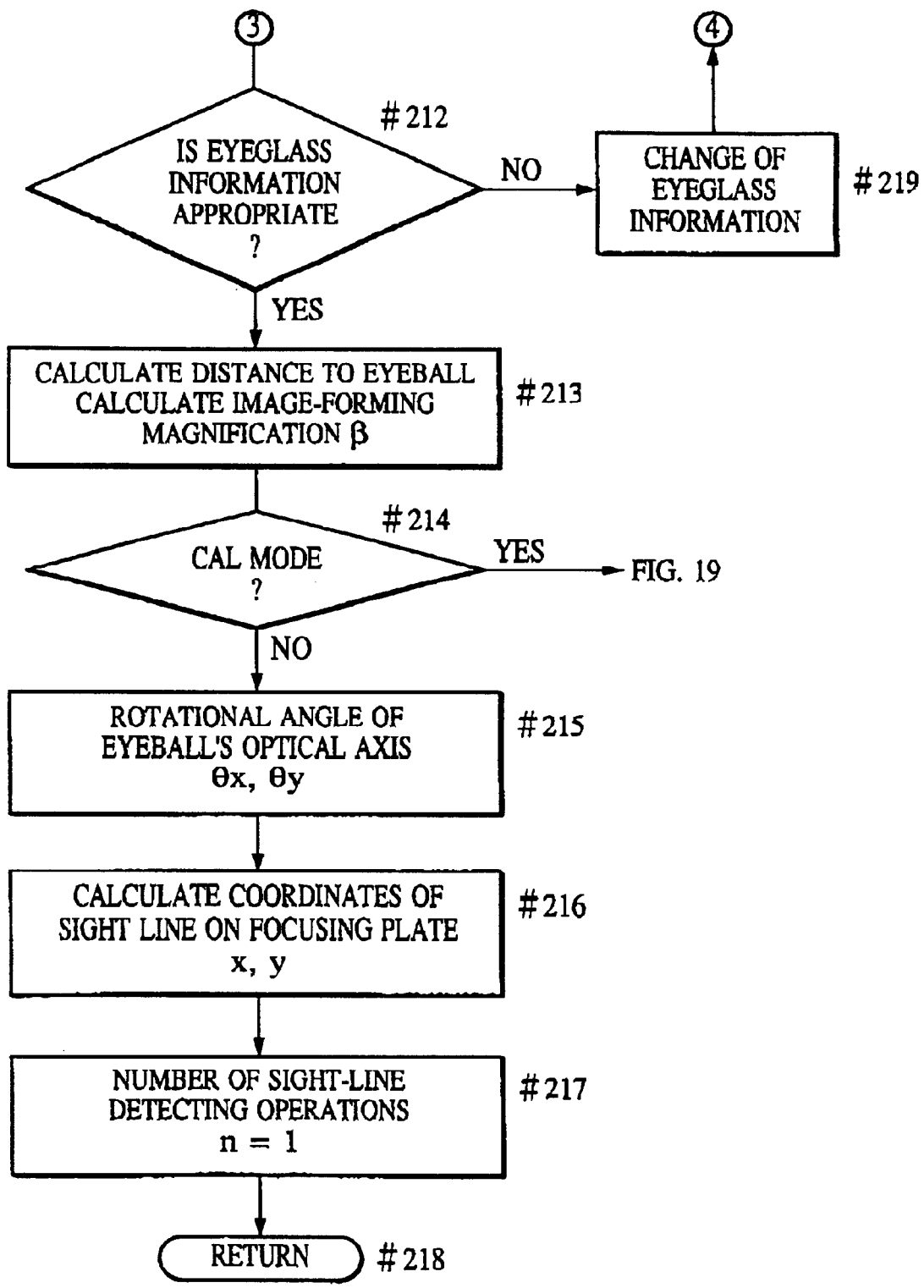
FIG. 13 is a flowchart illustrating a continuation of the operations shown in FIG. 12.

The flowchart for sight line detection shown in FIGS. 12 and 13 are effective for the calibration mode, as well.

At the step #201 in FIG. 12, once a decision has been made that the current sight line detection is one in the calibration mode, the flow proceeds to a step #220, at which a decision is made that the current sight line detection is one for a first time in the calibration mode. On determining that the current sight line detection is one for the first time in the calibration mode, the CPU carries an operation forward to a step #203, at which a measurement of the atmospheric lightness are performed in order to set the accumulation time of the CCD 14 and the illumination power of IREDs. Hereinafter, the same operations are repeated.

On deciding that the current sight line detection is one for a second time or the subsequent time in the calibration mode, the CPU carries an operation forward from the step #220 to a step #206. At this step, with regard to the accumulation time of the CCD 14 and the illumination power of IREDs, the values for the last time are adopted, and lighting up of the IREDs and an accumulation of the CCD 14 immediately starts.

At the next step #207, if the current mode is the sight line calibration mode, and the number of sight line detecting operations is two or more, the flow proceeds to a step #209, and on completing the accumulation of the CCD 14, the CPU 100 immediately executes a read-out of the CCD 14, since, for the read-out area, the same area as that for the last time is used. Operations from this afterward are the same as the foregoing.

In the flowchart for sight line detection shown in FIGS. 12 and 13, the variables when the flow returns to the main routine are, for the case of usual sight line detection, the coordinates (X, Y) on the sight line focusing plate. However, in the case of the sight line detection in the calibration mode, the above-described variables are the rotational angle (θx, θy) of the optical axis of the photographer's eyeball in accordance with the P-images. These variables are stored in the EEPROM 100a in accordance with the P-images. Other variables, such as the reliability of the detected results, the CCD accumulation time, and CCD read-out area are common variables.

In this embodiment, in order to set the accumulation time of the CCD and the illumination power of the IREDs, the photometric information detected by the photometric sensor 10 is utilized.

FIGS. 16 to 20 are flowcharts each explaining the sight line calibration. FIGS. 21 to 24 are views each showing the displaying state on the display portion 308 outside the viewfinder screen and the monitoring LCD 202 during the sight line calibration.

In this embodiment, among the seven focus detecting point marks shown in FIG. 2, four focus detecting point marks 305', 301', 306', and 307' are named as target 1, target 2, target 3, and target 4, and they are caused to be once gazed in sequence by the photographer. By detecting the sight line at that time, the calibration of sight line is implemented.

Hereinafter, this will be described with reference to FIG. 15 and FIGS. 16 to 24 which were mentioned above.

Figure 16:
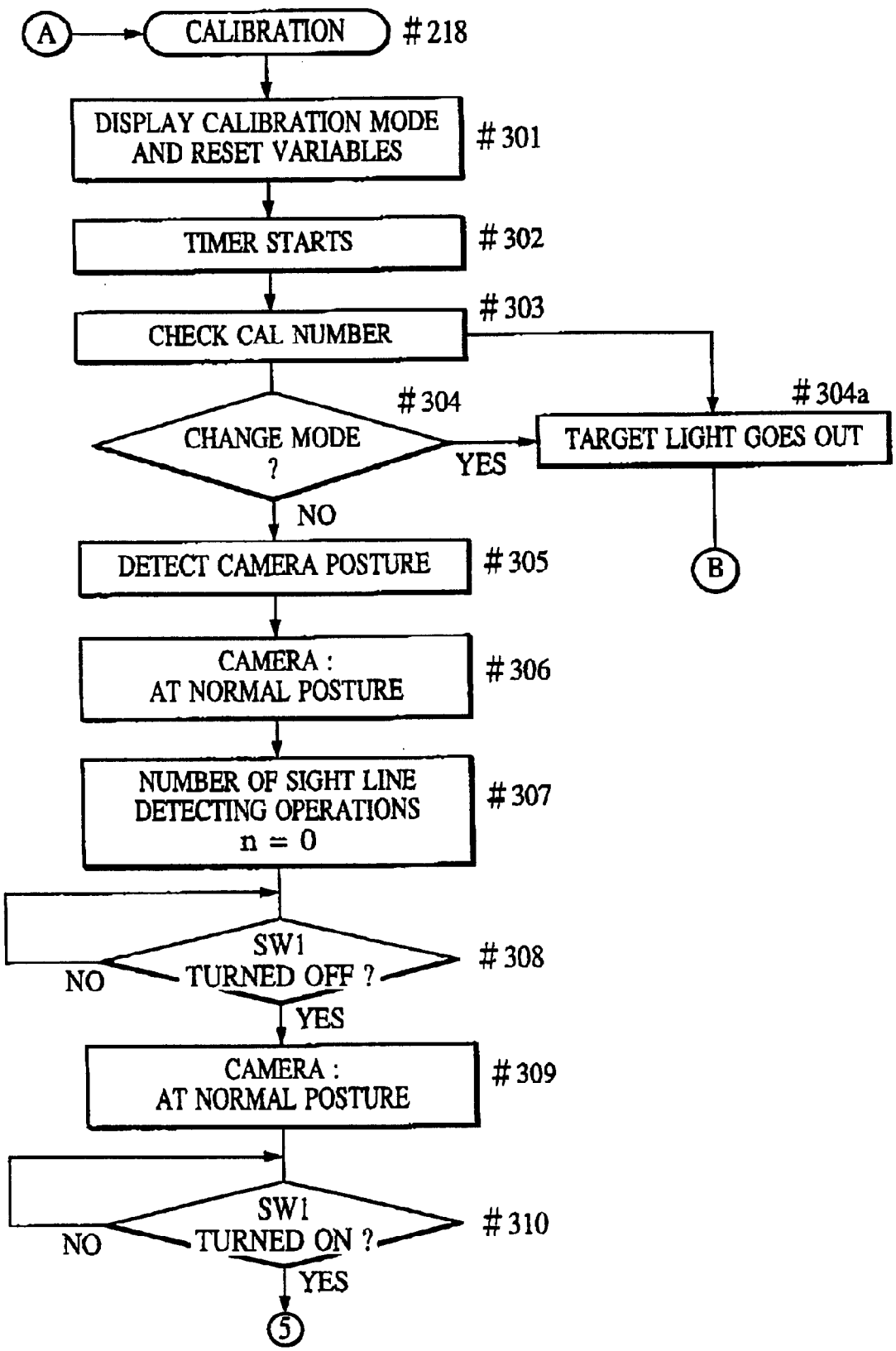
FIG. 16 is a flowchart illustrating a portion of the calibration operations of the camera in FIG. 1.

Once the simultaneous pushing of the mode buttons 204b and 204c has been made by the photographer, the calibration mode of sight line shown in a step mode #218 in FIG. 16 is set. Firstly at a step #301, the CPU 100 transmits a signal to the LCD driving circuit 105 to display on the display portion 813 displaying a shutter time value, and the display portion 814 displaying an aperture value on the display portion 308 (shown in FIG. 5B) outside the viewfinder screen, that the camera has come in any one of the sight line calibration mode (see FIG. 22) described later. Likewise the CPU 100 causes the display portion 802 displaying a shutter time value, and the display portion 803 displaying an aperture value on the monitoring LCD 202 to make the same displays. Then, variables other than the calibration data stored in the EEPROM 100a are reset.

FIG. 15 is a view showing the kinds and the initial values of the calibration data stored in the EEPROM 100a. Since calibration has never been performed, these values are all initial values. Camera posture information, eyeglass information (eyeglasses: "1", naked eyes: "0", coefficients ax, ay, kx, ky, b0x, and b0y for each of the calibration data on three P-images or more, and the calibration data on two P-images are stored into the respective addresses of the EEPROM 100a corresponding to the calibration number 1 to 5. Meanwhile, in this embodiment, the number of the kinds of storable calibration data has been set to five by way of explanation, but, of course, the number of the kinds of calibration data can be set arbitrarily depending on the capacity of the EEPRM.

The initial value of the calibration data is set so that the sight line is calculated using the eyeball parameters. In addition, there are provided flags indicating whether the photographer wears eyeglasses or not, and that indicating the degree of the reliability of the calibration data. The initial value of the flag indicating the presence/absence of eyeglasses is set to "1" so as to use eyeglasses, and that indicating the degree of the reliability of the calibration data is set to "0" so as to have no reliability.

Figure 22A:
FIGS. 22A to 22C are views each explaining the display for the calibration number during the above-described calibration operation.

As shown in FIG. 22A, on the display portion 308 outside the viewfinder screen, the display portions 802 and 813, and the display portions 803 and 814 of the monitoring LCD 202, the currently set calibration mode is displayed. The lights of other display portions are all put out. In this embodiment, the calibration number is represented to be in a state of "1", and only the display portions 802 and 813 are each illustrated in an enlarged shape.

Figure 22B:
Figure 22C:
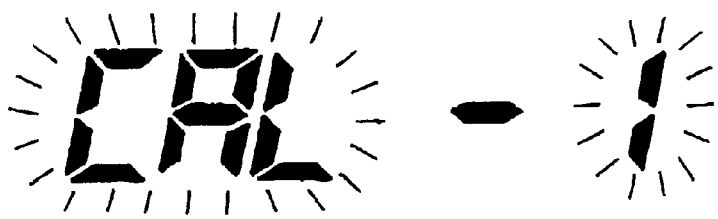

At this time, if the calibration data of the set calibration number is an initial value, the calibration number displayed on the monitoring LCD 202 blinks (see FIG. 22B). On the other hand, if a calibration has already been performed in the set calibration number, and a different calibration number different from the initial value has been entered into the address of the EEPROM 100a corresponding to the calibration number, the calibration number displayed on the display portion 308 outside the viewfinder screen, and the monitoring LCD 202, is arranged to fully light up (see FIG. 22A).

As a result, the photographer can recognize whether calibration data have already been put into each of the current set calibration numbers. Also, as shown in FIG. 22A, the initial value is set to "1".

Returning to FIG. 16, at a step #302, the CPU 100 starts a built-in timer, and begins the calibration of sight line. After starting the timer, the CPU 100 carries an operation forward to a step #303. After the starting of the timer, if no operation is performed with respect to the camera during a predetermined time, the flow proceeds to a step #304. If the target for sight line detection is in a lighted state, the target light is put out, and the flow returns to the main routine through a step #348 in FIG. 18.

Figure 23:
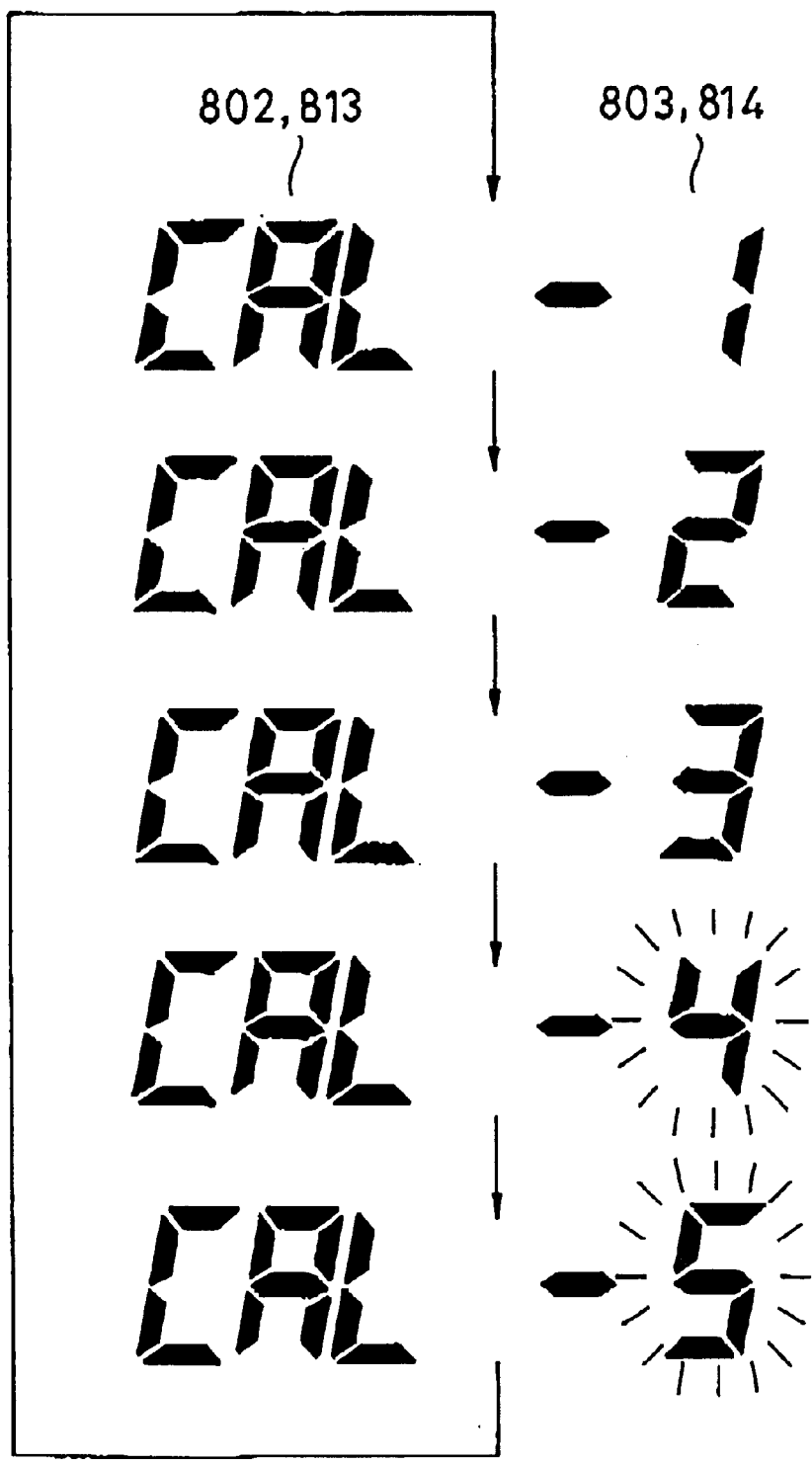
FIG. 23 is a view explaining the display for the calibration numbers during the above-described calibration operation.
Figure 25:
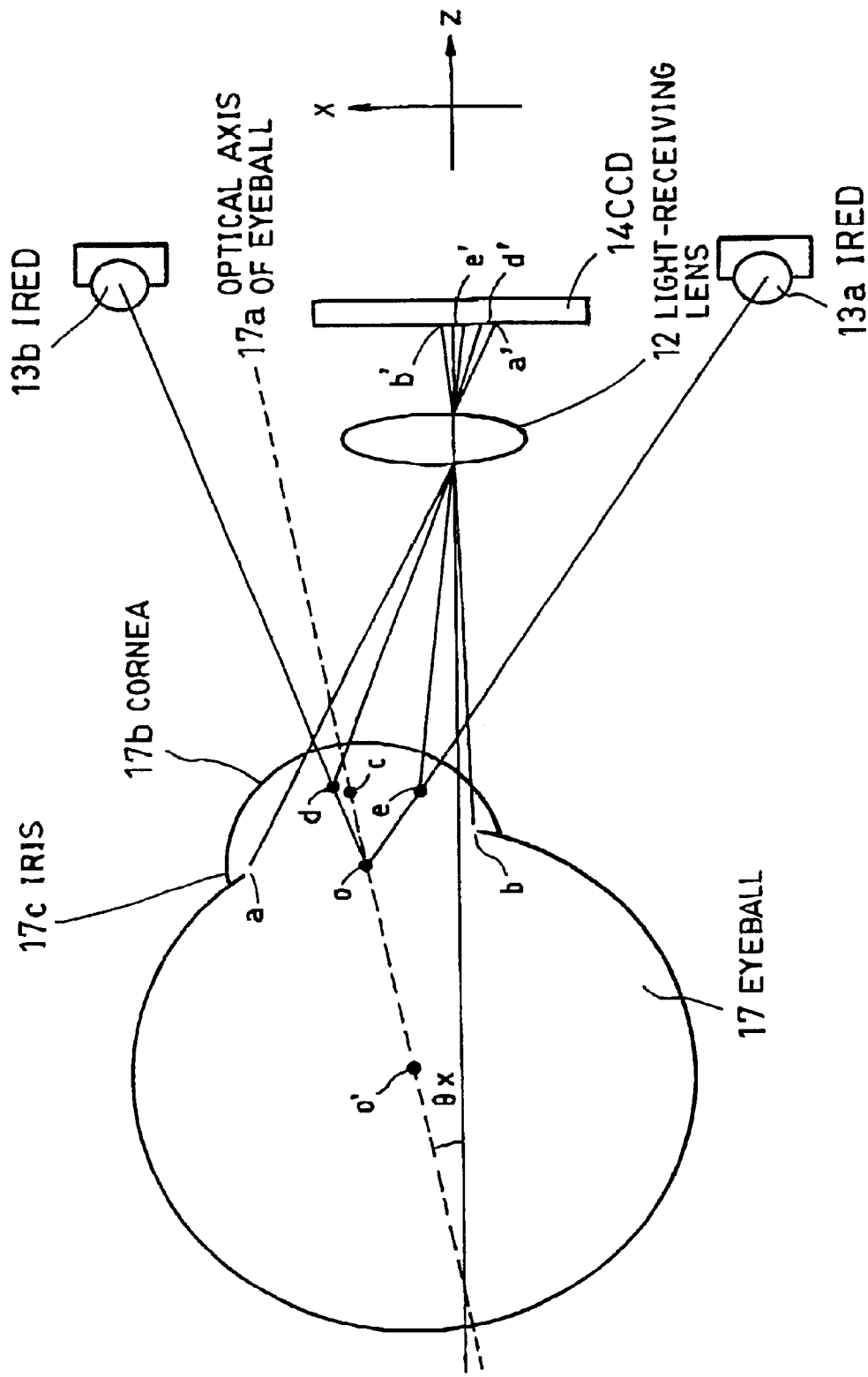
FIG. 25 is a view explaining the principle of a conventional sight line detection with two IREDs provided at the lower side.

When the photographer rotate the electronic dial 205 in order to change the calibration number, the signal which has detected the rotation thereof by a pulse signal as described above, is inputted to the CPU 100 through the signal input circuit 104. Thereby, the CPU 100 transmits a signal to the LCD driving circuit 105. As a consequent, in synchronization with the rotation of the electronic dial 205, the calibration number displayed on the displayed portion 308 outside the viewfinder screen, and the monitoring LCD 202 change. FIG. 23 illustrates the state of these display portions at this time.

First, when the photographer rotates the electronic dial 205 in the clockwise direction, the electronic dial 205 varies as "CAL-1" → "CAL-2" → "CAL-3" → "CAL-4" → "CAL-5", and the photographer can cause the calibration data to be stored in any one of five desired calibration numbers by an calibration operation described later. The state illustrated in FIG. 23 indicates that calibration data have already been entered into the "CAL-1", "CAL-2", and "CAL-3", but they have not yet entered into "CAL-4" and "CAL-5", i.e., the calibration data remain an initial value. On the other hand, when the electronic dial 205 is rotated in counterclockwise direction, the direction of the display become exactly opposed to the direction in FIG. 23.

Once the photographer has selected a desired calibration number, looking at the calibration number thus displayed on the display portion 308 outside the viewfinder screen, and the monitoring LCD 202, the CPU makes a check of the corresponding calibration data number through the signal input circuit 104 at a step #303. The, the CPU 100 stores the checked calibration data number into a predetermined address in the EEPROM. However, if the checked calibration data number has not been changed, the storage of the checked calibration data number into the EEPROM does not executed.

Next, the flow proceeds to a step #304, and a check of the photographing mode is made through the signal input circuit 104. Here, if a decision is made that the photographer has changed the photographing mode into a photographing mode other than the calibration mode during the operation of operation members, the flow proceeds to a step #304a. At this step, if targets for sight line calibration in the viewfinder is blinking, the target lights are put out, and the flow returns to the camera photographing operation, which is the main routine, via the step #348 in FIG. 18. Also, if the photographing mode has been changed into another photographing mode (shutter priority AE), with the calibration numbers "CAL1" to "CAL5" displayed, the photographing operation using the above-described sight line information can be executed by performing sight line detection using the calibration number data. At this time, by lighting up the sight-line input mode display portions 817 and 801 in FIG. 5A d 5B in addition to the photographing mode display, on the the display portion 308 outside the viewfinder screen, and the monitoring LCD 202, the CPU 100 informs the photographer that the camera is in the sight line input mode (sight line photographing mode) which controls the photographing operation on the basis of the sight line information.

Here, once the simultaneous pushing of the mode buttons 204b and 204c has again been made by the photographer, the sight line calibration mode is set, and after the calibration number is displayed used for the above-described sight line detection, calibration operation starts.

Moreover, at the step #304, on checking that the camera remains set to the sight line calibration mode, the CPU 100 detects the posture of the camera through the signal input circuit 104 at the next step #305. Specifically, by processing an output signal of the posture detecting device 27 through the signal input circuit 104, the CPU 100 detects whether the camera takes the normal posture or the vertical position, Furthermore, when the camera takes the vertical position, the CPU 100 detects, for example, whether the grip is situated in the sky direction (upside) or in the ground direction (downside).

At the next step #306, on detecting that the camera takes the normal posture, the CPU 100 carries an operation forward to a step #307, and sets the number n of sight line detecting operations to 0. However, when the number n of sight line detecting operations is 40, the number is held. At this time, if "CAL" display is blinking on the display portion 308 outside the viewfinder screen, the CPU 100 stops the blink. The sight line calibration is set to start by turning on the switch SW1.

In order to prevent the camera side from starting a calibration before the photographer's preparation for a sight line calibration, the CPU 100 checks the state of the switch SW1 at the next step #308. If the camera mains on on-state, the flow stands by until the switch SW1 turns off. Thereafter, on verifying that the switch SW1 has turned off, the CPU 100 carries an operation forward to a step #309, and transmits a signal to the LED driving circuit 106 to cause the focus detecting point mark 305', which is the target 1 for sight line calibration (see FIG. 21A), to blink. Then, the CPU 100 carries an operation forward to a step #310, and checks the state of the switch SW1, which is a trigger switch for starting the sight line calibration. If the switch SW1 is not in an on-state, the flow stands by until the switch SW1 turns on.

Figure 17:
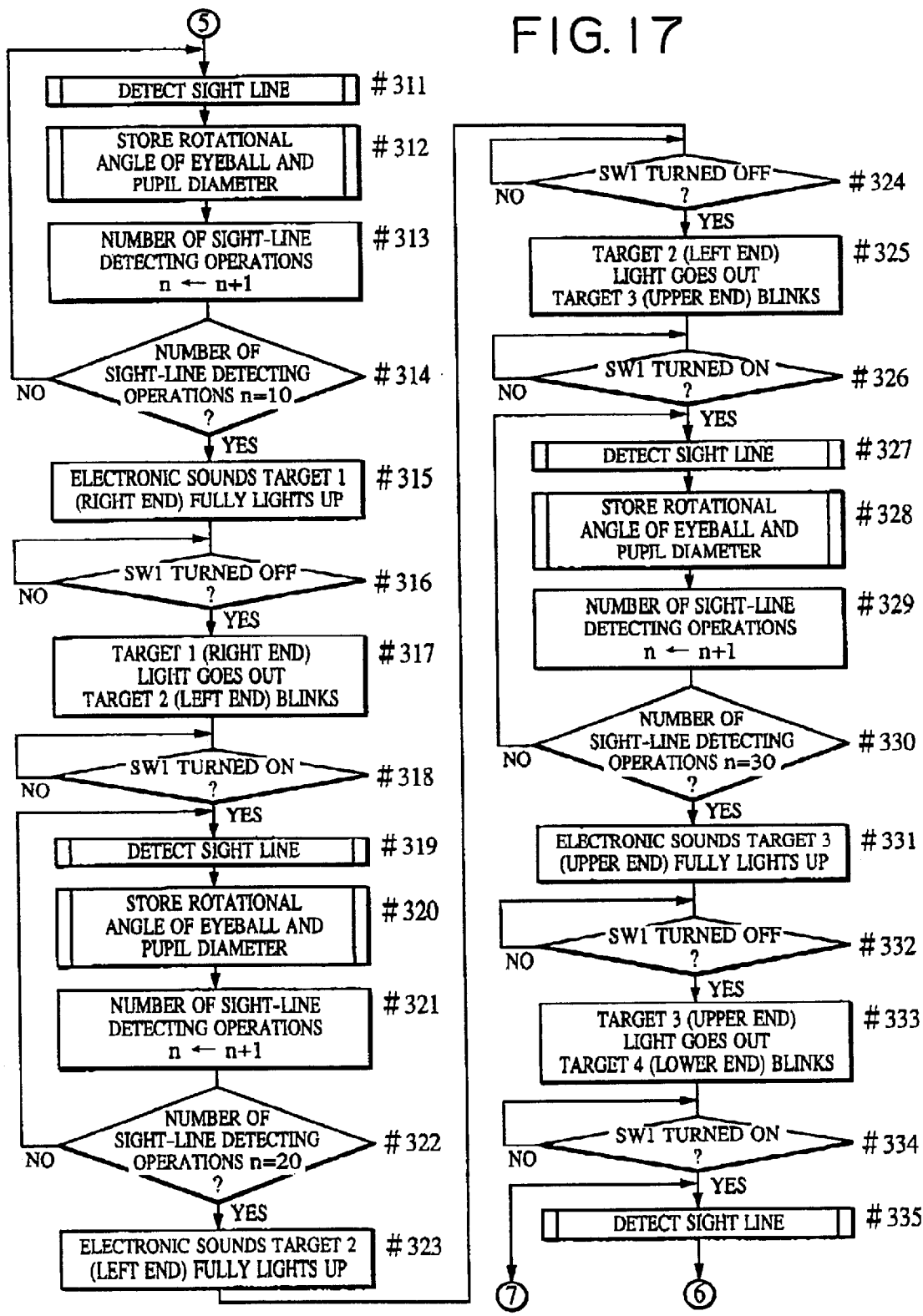
FIG. 17 is a flowchart illustrating a continuation of the operations shown in FIG. 16.

Thereafter, once the photographer has gazed the target 1 which started blinking, and pushed the release button 201 to turn on the switch SW1, the flow proceeds from the step #310 to the step #311 in FIG. 17, and sight line detection is executed. At the next step #312, the CPU 100 stores the rotational angle $\theta x$ and $\theta y$ of the eyeball, the pupil diameter rp, and the reliability of each of the data, which are variables from the subroutine for sight line detection.

The operation of sight line detection is the same as the case described in the flowchart in FIGS. 12 and 13, but the decision portion (step #214) in FIG. 13 wherein a decision is made whether the current mode is the calibration mode or not, is different from the case of the above-described flowchart in FIGS. 12 and 13. Specifically, in the case of the sight line detection in the calibration mode, the operation proceeds to the flowchart shown in FIG. 19. In this flowchart, the portion wherein the pupil diameter rp and the reliability of each of the data are stored, is the same as that of the above-described chart in FIGS. 12 and 13, but this flowchart is one for calculating and storing the rotational angles $\theta x$ and $\theta y$ of the eyeball, unlike the case of a usual sight line detection.

Here, using the flowchart in FIG. 19, the calculation and storage (step #312 in FIG. 17) of the rotation angles $\theta x$ and $\theta y$ of the eyeball will be described.

On checking that the camera is in the calibration mode) step #214), the CPU 100 makes a check, at a step #402 in FIG. 19, of the number of the Purkinje images (P-images) as a result of the Purkinje image state discrimination (step #211 in FIG. 12) which determining the configuration and that number of Purkinje images. As a result, if it is verified that the number of the Purkinje images is four, i.e., the Purkinje image state is a four P-image state, the rotational angles $\theta x$ and $\theta y$ are calculated, at step #403 and 406, from the Purkinje images P1, P2, P3, and P4, as $\theta 4px$ and $\theta 4px$ and $\theta 4py$, as described above. At the next step #407, a check is made whether the values $\theta 4px$ and $\theta 4py$ are in a predetermined range or not. If so, at the ensuing step #408, the values $\theta 4px$ and $\theta 4py$ are stored into the address of the portion corresponding to the target 1 in the four p-image state in the calibration data of the EEPROM 100a. On the other hand, if the values $\theta 4px$ and $\theta 4py$ are out of the predetermined range, the CPU 100 does not store them into the EEPROM 100a, judging the photographer as gazing no target, since these values are inappropriate as rotational angles of the eyeball. Then, at a step #412, rotational angles $\theta x$ and $\theta y$ are calculated from the Purkinje images P1 and P2, as $\theta 2px$ and $\theta 2py$, and at the next step #413, and a check is made whether the values $\theta 2px$ and $\theta 2py$ are in a predetermined range or not. If so, at the ensuing step #414, the values $\theta 2px$ and $\partial 4 2py$ are stored into the address of the portion corresponding to the target 1 in the two p-image state in the calibration data of the EEPROM 100a.

Also, if it is verified that the number of the Purkinje images is three, i.e., the Purkinje image state is a three P-image state, the rotational angles $\theta x$ and $\theta y$ are calculated, at steps #404 and 409, from the Purkinje images P1, P2, and P3 or P4, as $\theta 3px$ and $\theta 3py$, as described above. At the next step #410, a check is made whether the values $\theta 3px$ and $\theta 3py$ are in a predetermined range or not. If so, at the ensuing step #4118, the values $\theta 3px$ and $\theta 3py$ are stored into the address of the portion corresponding to the target 1 in the three p-image state in the calibration data of the EEPROM 100a. On the other hand, if the values $\theta 3px$ and $\theta 3py$ are out of the predetermined range, the CPU 100 does not store them into the EEPROM 100a, since these values are inappropriate as rotational angles of the eyeball. Then, at a step #412, rotational angles $\theta px$ and $\theta y$ are calculated from the Purkinje images P1 and P2, as $\theta 2px$ and $\theta 2py$, and at the next step #413, and a check is made whether the values $\theta 2px$ and $\theta 2py$ are in a predetermined range or not. If so, at the ensuing step #414, the values $\theta 2px$ and $\theta 2py$ are stored into the address of the portion corresponding to the target 1 in the two p-image state in the calibration data of the EEPROM 100a.

Thus, in the calibration mode, in the case where the number of Purkinje images is three or more, i.e., in the case of the four or three p-image state, the calibration data of two P-image state is also calculated and stored, based on the results of a single time detection (#403 → #412 to #414, #404 → #412 to #414).

Furthermore, if it is verified that the number of the Purkinje images is two, i.e., the Purkinje image state is a two P-image state, the rotational angles $\theta x$ and $\theta y$ are calculated, at steps #405 and 412, from the Purkinje images P1 and P2, as $\theta 2px$ and $\theta 2py$, as described above. At the next step #413, a check is made whether the values $\theta 2px$ and $\theta 2py$ are in a predetermined range or not. If so, at the ensuing step #414, the values $\theta 2px$ and $\theta 2py$ are stored into the address of the portion corresponding to the target 1 in the two p-image state in the calibration data of the EEPROMa . On the other hand, if the values $\theta 2px$ and $\theta 2py$ are out of the predetermined range, these values are not stored into the EPPROMa, since these values are inappropriate as rotational angles of the eyeball.

Herein, since the target 1 is in a single blink state (step #309 in FIG. 10), the rotational angles $\theta x$ and $\theta y$ has been stored into the address of the portion corresponding to the target 1. However, there are provided address portions to store these rotational angles $\theta x$ and $\theta y$, depending on blinking targets.

Returning to FIG. 17, once the rotational angles θx and θy of the eyeball, the pupil diameter rp, and the reliability of data have been stored as described above, the flow proceeds to a step #313, the number n in the sight line detecting operations is counted up. There are some variations among sight lines of the photographer, and hence, in order to achieve correct sight line calibration data, it is effective to perform a plural times of sight line detecting operations for a single target and to use the average of the detected values. For this object, in this embodiment, the number n of sight line detecting operations is set to ten, and at the next step #314, a decision is made whether the number n of sight line detecting operations is 10 or not. If the number n has not yet reached 10, the flow returns to the step #311, and the sight line detection is carried on.

On the other hand, at the above-described step #314, if the number n has already reached 10, the sight line detection with respect to the target 1 (focus detecting point mark 305') is finished, and the flow proceeds to a step #315 in order to make the photographer aware of the completion of the sight line detection for the target 1. At this step, the CPU 100 produces electronic beeps several times by using a sounding body (not shown), and simultaneously lights up fully the target 1 for a predetermined time through the LED driving circuit 106, thereby informing the photographer that the collection of the calibration data at the target 1 has been finished.

Next, at a step #316, the CPU 100 makes a decision whether the switch SW1 is in an off-state or not, through the signal input circuit 104. If the switch SW1 remains on-state, the flow stands by until the SW1 is turned off. Thereafter, once the switch SW1 has been turned off, the flow proceeds to a step #317. The light of target 1 is put off, and simultaneously the blinking of the target 2 (focus detecting point mark 301') at the left end is started (see FIG. 21B). At the next step #318, a decision is made whether the switch SW1 is in an on-state or not, through the signal input circuit 104. If the switch SW1 remains off-state, the flow stands by until the SW1 is turned on. Thereafter, once the switch SW1 has been turned on, the flow proceeds to a step #319.

At the step #319, a sight line detection is performed, and at the ensuing step #320, the CPU stores the rotational angles θx and θy of the eyeball, the pupil diameter rp, and the reliability of data, which are variables from the subroutine for sight line detection. Here also, processing in accordance with the flowchart in FIG. 19 is performed, the calculated results are stored into the address corresponding to the target 2 of the EEPROM 100a. Then, at a step #321, the number of n of sight line detecting operations is counted up. At the ensuing step #322, a decision is made whether the number n of sight line detecting operations has reached 20 or not. If not, the flow returns to the step #319, and the sight line detection is carried on. On the other hand, if the number n has already reached 20, the flow proceed to a step #323, and the sight line detection with respect to the target 2 is finished. In order to make the photographer aware of the completion of the sight line detection for the target 2, the CPU 100 produces electronic beeps several times using a sounding body (not shown), and simultaneously lights up fully the target 2 through the LED driving circuit 106, thereby informing the photographer that the collection of the calibration data at the target 2 has been finished.

Next, at a step #324, the CPU 100 makes a decision whether the switch SW1 is in an off-state or not, through the signal input circuit 104. If the switch SW 1 remains on-state, the flow stands by until the SW1 is turned off. Thereafter, once the switch SW1 has been turned off, the flow proceeds to a step #325. The light of target 2 is put off, and simultaneously the blinking of the target 3 (focus detecting point mark 306') at the upper end is started (see FIG. 21C). At the next step #318, a decision is made whether the switch SW1 is in an on-state or not, through the signal input circuit 104. If the switch SW1 remains off-state, the flow stands by until the SW1 is turned on. Thereafter, once the switch SW1 has been turned on, the flow proceeds to a step #327.

At the next step #327, sight line detection is performed, and at the ensuing step #328, the CPU stores the rotational angles θx and θy of the eyeball, the pupil diameter rp, ad the reliability of data, which are variables from the subroutine for sight line detection. Here also, processing in accordance with the flowchart in FIG. 19 is performed, the calculated results are stored into the address corresponding to the target 3 of the EEPROM 100a. Then, at a step #329, the number n of sight line detecting operations is counted up. At the ensuing step #330, a decision is made whether the number n of sight line detecting operations has reached 30 or not. If not, the flow returns to the step #327, and the sight line detection is carried on. On the other hand, if the number n has already reached 30, the flow proceed to a step #331, and the sight line detection with respect to the target 3 is finished. In order to make the photographer aware of the completion of the sight line detection for the target 3, the CPU 100 produces electronic beeps several times using a sounding body (not shown), and simultaneously lights up fully the target 3 through the LED driving circuit 106, thereby informing the photographer that the collection of the calibration data at the target 3 has been finished.

At the next step #331, the CPU 100 makes a decision whether the switch SW1 is in an off-state or not, through the signal input circuit 104. If the switch SW1 remains on-state, the flow stands by until the SW1 is turned off. Thereafter, once the switch SW1 has been turned off, the flow proceeds to a step #333. The light of target 3 is put off, and simultaneously the blinking of the target 4 (focus detecting point mark 307') at the lower end is started (see FIG. 21D). At the next step #334, a decision is made whether the switch SW1 is in an on-state or not, through the signal input circuit 104. If the switch SW1 remains off-state, the flow stands by until the SW1 is turned on. Thereafter, once the switch SW1 has been turned on, the flow proceeds to a step #335.

Figure 18:
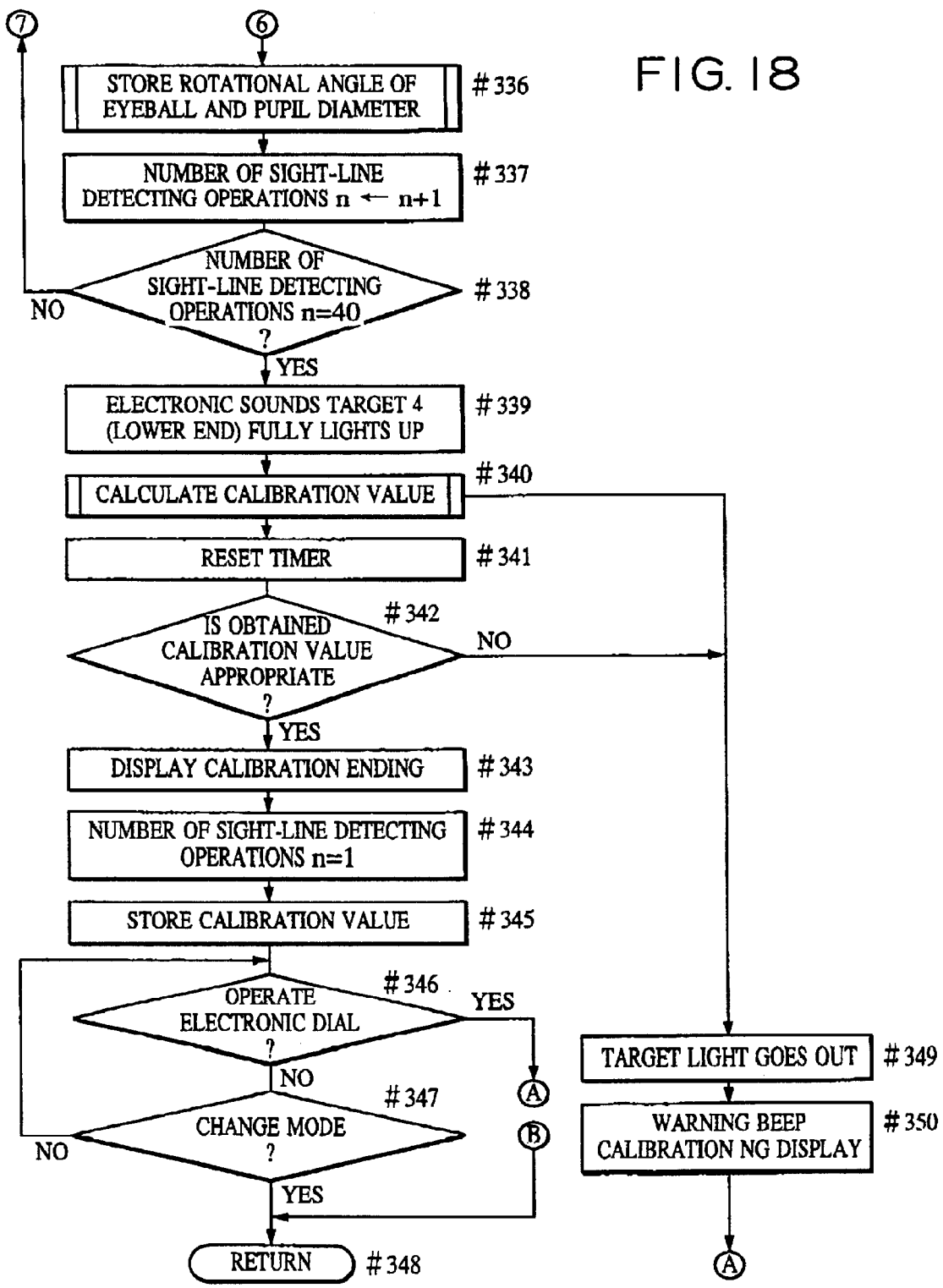
FIG. 18 is a flowchart illustrating a continuation of the operations shown in FIG. 17.

At the next step #335, sight line detection is performed, and at the ensuing step #336 in FIG. 18, the CPU stores the rotational angles θx and θy of the eyeball, the pupil diameter rp, and the reliability of data, which are variables from the subroutine for sight line detection. Here also, processing in accordance with the flowchart in FIG. 19 is performed, the calculated results are stored into the address corresponding to the target 3 of the EEPROM 100a. Then, at a step #337, the number n of sight line detecting operations is counted up. At the ensuing step #338, a decision is made whether the number n of sight line detecting operations has reached 40 or not. If not, the flow returns to the step #335 in FIG. 17, and the sight line detection is carried on. On the other hand, if the number n has already reached 40, the flow proceed to a step #339, an the sight line detection with respect to the target 4 is finished. In order to make the photographer aware of the completion of the sight line detection for the target 4, the CPU 100 produces electronic beeps several times using a sounding body (not shown), and simultaneously lights up fully the target 4 through the LED driving circuit 106, thereby informing the photographer that the collection of the calibration data at the target 4 has been finished.

As described above, sight line detection has been executed with respect to each of the targets 1 to 4, the sight line detection for determining the calibration of sight line has been completed.

Next, the flow proceeds to a step #340, the calibration data on sight line are calculated from the rotational angles θx and θy of the eyeball and the pupil diameter rp. The outline of the calculating method for sight line calibration data is as follows.

Let the coordinates of then target 1, target 2, target 3, and target 4 on the focusing plate be x1, 0), (x2, 0), (0, y3) and (0, y4), respectively, and let the average values of the rotational angles (θx, θy), of the eyeball when the photographer gazes the target 1, target 2, target 3, and target 4 stored into the EEPROMa be (θx1, θy1), (θx2, θy2), (θx3, θy3), and (θx4, θy4), respectively.

For determining the calibration data in the x-direction, data on the target 1 and target 2 are used, and for determining the calibration data in the y-direction, data on the target 3 and target 4 are used.

Here, if the weighted average of the average values r1 and r2 of the pupil diameter is represented by rpx, and the weight average of the average values r3 and r4 of the pupil diameter is represented by rpy, the calibration data ax, ay, kx, ky, b0x, and b0y are determined as follows.

For example, when rpm and rpy≧rp, kx and ky are each set to b 0,and $$ax=(x1-x2)/m(\theta x1-\theta x2)$$

$$b0x=-(\theta x1+\theta x2)/2$$

$$ay=(y3-y4)/m(\theta y3-\theta y4)$$

$$b0y=-(\theta y3+\theta y4)/2$$

(θx1, θy1), (θx2, θx2), (θx3, θy3), and (θx4, θx4), which are, as described above, the average values of the rotational angles (θx, θy) of the eyeball when the photographer gazes the target 1, target 2, target 3, and target 4 stored into the EEPROM 100a, include the average value of (θ4px, θ4py) in the four P-image state, that of (θ3px, θ3py) in the three P-image state, and that of (θ2px, θ2py) in the two P-image state, respectively. Hereinafter, details of the calculation (step #340) of each of the calibration values of the calibration data on three P-image or more, and data on the two P-image will be described with reference to the flowchart in FIG. 20.

Firstly, at a step #501, a check is made of the number of the data on (θ2px, θ2py) in the two P-image stage of the targets 1 to 4, which are stored and accumulated in the EEPROM 100a. Then, ten times of sight line detecting operations are performed, and as a consequence, if the number of the data on (θ2px, θ2py) in the two P-image state which is in a predetermined range (step #413) is not more than "6", the CPU 100 executes again a calibration (the flow transfers to the step 218 in FIG. 16), judging that, even if calibration data are calculated, it is devoid of reliability.

On the other hand, if the number of the above-described data on (θ2px, θ2py) is not less than "7", the flow proceeds to the step 502, a check is made of the number of the data on(θ4px, θ4py) in the four P-image state of the targets 1 to 4 which is stored and accumulated in the EEPROM 100a. As a consequence, if the number of the data on (θ4px, θ4py) is not less than "5", the CPU 100 carries an operation forward to the step 503, judging the calibration data as having reliability, and performs the calculation of the calibration data on the three P-images or more. For each of (θx1, θy1), (θx2, θy2), (θx3, θy3), and (θx4, θy4), which require the above-described calibration data, the weighted average of the average value (θ4px, θ4px) in the four P-image state and the average value of (θ3px, θ3py) in the three P-image state are used, and calibration data ax, ay, kx, key b0x, and b0y are determined based on the above-described calculation.

The object of putting together the calibration data on the four P-image state and that on the three P-image state into the calibration data on the three P-images or more, is to reduce the data address portion by unifying two calibration data, because θ4py and θ3py, which are the rotational angle θy of the eyeball, are calculated by an identical equation (4), and the difference between the values θ4py and θ3py is small.

Also, the flow proceeds to a step #504, and calculation is performed of the calibration data on the two P-image state, and at this step #504, the average value of (θ2px, θ2py) in the two P-image state is used for (θx1, θy1), (θx2, θy2), (θx3, θy3) and (θx4, θy4), which require the above-described calibration data.

In this manner, by a single calibration acquisition operation, both of the calibration data on the three P-image or more, and that on the two P-image state are calculated.

If the number of the data on (θ3px, θ3py) is not more than "4", the calculation of the calibration data on the three P-images or more, has no reliability, so that only the calculation of the calibration data on the two P-image state is performed.

Returning to FIG. 18, after the calculation of the sight line calibration (step #340), or after the sight line detection, the flow proceeds to the step #341, the timer is reset. At the ensuing step #342, the CPU 100 makes a decision whether the calculated sight line calibration data are correct or not, through the sight line detecting circuit 101 doubling as deciding means 101 for the reliability of calibration data. If the calculated sight line calibration data are in the range of general personal differences, the CPU 100 judges the data as being "appropriate". On the other hand, if the calculated sight line calibration data significantly depart from the range of the general personal differences, the CPU 100 judges the calculated sight line calibration data as being inappropriate".

When judging the calculated sight line calibration data as being "inappropriate" by the above-described decision, the CPU carries an operation forward proceeds to a step #349, and disenergizes the superimposing LED to put out the light of the target 4 through the LED driving circuit 106. Then, at the next step #350, the CPU 100 produces electronic beeps for a predetermined time by using a sounding body (not shown), thereby warning the photographer that the calibration of the sight line has failed. Simultaneously, the CPU 100 transmits a signal to the LCD driving circuit 105 to cause the display portion 308 outside the viewfinder and the monitoring LCD 202 to blink the "CAL" display thereof, as a warning (see FIG. 22C).

After the warning beep by the sounding body and the warning display by the LCDs 308 and 202 time have been given for a predetermined, the flow transfers to the initial step #301 in the calibration routine, and the camera is set to be in a state wherein the calibration of sight line can be again executed.

Furthermore, if the calculated sight line calibration data are "appropriate", the CPU 100 carries an operation forward to the step #343, and display the completion of the calibration of sight line through the LCD driving circuits 105 and 106. Specifically, the LCD driving circuit 105 is adapted to transmit a signal the display portion 308 outside the viewfinder and the monitoring LCD 202 to display "End-n" (n: calibration number) for a predetermined time (see FIG. 24B).

At the next step #344, the number n of sight line detecting operations is set to 1, and at the ensuing step #345, the further stored sight line calibration data are stored into an EEPROM 110*b* address portion, which corresponds to the currently set calibration data number. At this time, if some sight line calibration data have already been stored into the EEPROM 110*b* address portion into which the photographer attempts to store sight line calibration data, the calibration data are renewed.

After the completion of a sequence of sight line calibration, at steps #346 and #347, the flow stands by until the electronic dial 205 or the mode buttons 204*a*, 204*b*, and 204*c* are operated. Here, if the photographer rotates the electronic dial 205 to select another calibration number, the CPU 100 detects this change of the calibration number through the signal input circuit 104 at a step #346, and transfers an operation to the initial step #301 in the calibration routine.

Also, if the photographer operates the mode buttons 204*a*, 204*b*, and 204*c* to select another photographing mode, the CPU 100 detects this change of the photographing mode at a step #347, and returns an operation to the main routine via a step #348.

Meanwhile, in the above-described embodiment, an example is shown wherein calibration of sight line is performed setting the number of sight line detecting operations when the photographer is gazing a single target to ten. However, the number of sight line detecting operations is not restricted, but it may be more than 10.

Also, as shown in FIG. 2, in the above-described embodiment, a camera having a plurality of focus detecting points is taken as an example, but the present invention is not limited to this. The present invention can also be applied to a camera which has a plurality of measuring points which is an area for measuring the distance to an object.

In the above-described embodiment, the case where the present invention is applied to a camera is shown, but the present invention can be applied to optical equipment having a sight line detecting function or other equipment.

Besides, in the above-described embodiment, as an illumination source, an example wherein two illumination sources are provided upside, but the number of the illumination sources upside have only to be at least one. However, considering various observation conditions, a layout as shown in FIG. 4 is desirable. While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A device having a sight line detecting function, comprising:

illuminating device which illuminates an eyeball of an observer looking into an observation screen, by a plurality of light-emitting members;

an image-pickup member which receives the light reflected from the eyeball;

rotational angle calculating device which calculates the rotational angle of the eyeball of the observer, using the cornea reflection images detected by said image-pickup members;

correcting device which calculates correction data for correcting error between the calculated rotational angle value and the sight line of the observer, and which stores the correction data; and said correcting device storing a plurality of correction data corresponding to the number of said cornea reflection images, with respect to the same observer.

2. A device having a sight line detecting function in accordance with claim 1, further comprising:

selecting device which decides the number of said cornea reflection images when said rotational angle calculating device detects a rotational angle, and which selects correction data corresponding to the decision results.

3. A device having a sight line detecting function in accordance with claim 1, wherein:

said correcting device calculates a plurality of correction data corresponding to different numbers of cornea reflection images, using the cornea reflection images which have been simultaneously detected, and then stores the calculated results.

4. A device having a sight line detecting function in accordance with claim 1, wherein all of said plurality of light-emitting members are not arranged on the same straight line.

5. A device having a sight line detecting function in accordance with claim 1, wherein said plurality of correction data also corresponds to the configuration of said cornea reflection images.

6. A device having a sight line detecting function in accordance with claim 5, further comprising:

selecting device which decides the number of said cornea reflection images and the configuration thereof detected by said image-pickup member when said rotational angle calculating device detects a rotational angle, and which selects sight line correction data corresponding to the decision results.

7. A device having a sight line detecting function in accordance with claim 5, wherein:

said correcting device calculates a plurality of correction data corresponding to cornea reflection images which are different in the number and the configuration, using the cornea reflection images which have been simultaneously detected, and then stores the calculated results.

8. A device having a sight line detecting function in accordance with claim 5, wherein said correcting device calculates correction data respectively corresponding to the case where a plurality of said cornea reflection images is detected only on the downside of an observation screen, and the case where a plurality of said cornea reflection images is detected on the downside of the observation screen and at least one of the cornea reflection images are detected on the upwide thereof.

9. A device having a sight line detecting function in accordance with claim 1, further comprising:

a plurality of focus detecting areas provides within said observation screen; and focus detecting area selecting device which calculates sight line information by correcting error between the calculated rotational angle value and the sight line using said correction data, and which selects the focus detecting areas corresponding to said sight line information.

10. A device having a sight line detecting function, comprising:

illumination device which illuminates an eyeball of an observer looking into an observation screen, by a plurality of light-emitting members;

an image-pickup member which receives the light reflected from the eyeball;

rotational angle calculating device which calculates the rotational angle of the eyeball of the observer, using the cornea reflection images detected by the image-pickup member;

correcting device which calculates correction data for correcting error between the calculated rotational angle value and the sight line of the observer, and which stores the correction data; and said correcting device calculating a plurality of correction data from the cornea reflection images which have been simultaneously detected, with respect to the same observer.

11. A device having a sight line detecting function in accordance with claim 10, wherein said plurality of correction data corresponds to the detected number of said cornea reflection images.

12. A device having a sight line detecting function in accordance with claim 10, wherein said plurality of correction data corresponds to the detected configuration of said cornea reflection images.

13. A device having a sight line detecting function in accordance with claim 10, further comprising:

a plurality of focus detecting areas provided within said observation screen; and focus detecting area selecting device which calculates sight line information by correcting error between the calculated rotational angle value and the sight line using said correction data, and which selects the focus detecting areas corresponding to said sight line information.

\* \* \* \* \*

UNITED STATES PATENT AND TRADEMARK OFFICE
CERTIFICATE OF CORRECTION

PATENT NO. : 6,507,702 B2
DATED : January 14, 2003
INVENTOR(S) : Tadasu Ohtani

It is certified that error appears in the above-identified patent and that said Letters Patent is hereby corrected as shown below:

Column 1,
Line 11, "has" should read -- have --.
Line 60, "form" should read -- forms --.

Column 4,
Line 21, "photographer'" should read -- photographer's --.
Line 64, "an" should read -- a --.

Column 5,
Line 26, "corresponding" should read -- correspond --.
Line 57, "a" should be deleted.

Column 7,
Line 43, "a" should be deleted.
Line 55, "a" should read -- a focus detecting device --.
Line 67, "are" should read -- is --.

Column 8,
Line 66, "gazing" should read -- gazing at --.

Column 11,
Line 31, "move" should read -- moves --.
Line 48, "lights" should read -- light up --.

Column 12,
Line 1, "lie" should read -- line --.
Line 25, "is" should read -- are --.
Line 64, "correspond" should read -- corresponding --.
Line 66, "becomes" should read -- become --.

Column 13,
Line 27, "circuits" should read -- circuit --.

Column 14,
Line 24, "proceed" should read -- proceeds --.
Line 32, "the" should read -- to the --.
Line 36, "recognizes," should read -- recognize, --.

UNITED STATES PATENT AND TRADEMARK OFFICE
CERTIFICATE OF CORRECTION

PATENT NO.    : 6,507,702 B2
DATED         : January 14, 2003
INVENTOR(S)   : Tadasu Ohtani It is certified that error appears in the above-identified patent and that said Letters Patent is hereby corrected as shown below:

Column 15,
Line 2, "an" should read -- the --.
Line 21, "the area at which" should read -- which part of the gazing-point area --.
Line 22, "gazing point area" should be deleted.
Line 40, "are" should read -- is --.
Line 43, "exists" should read -- exist --.

Column 16,
Line 25, "proceed" should read -- proceeds --.
Line 33, "point" should read -- points --; and "in" should read -- on --.
Line 40, "continue" should read -- continues --; and "witch" should read -- switch --.
Line 47, "know" should read -- known --.

Column 17,
Line 21, "stops and" should read -- stops the --.
Line 34, "the CPU 100 detects that the camera has" should read -- the CPU 100 (as described below) detects the calibration number to which the camera has been set. --.
Line 35, "been set to which calibration number described later." should be deleted.

Column 18,
Line 6, "riving" should read -- driving --.
Line 21, "area." should read -- area, --.
Line 22, "The" should read -- the --.
Line 24, "in" ($2^{nd}$ occurrence) should read -- is --.
Line 45, "square" should read -- squares --.

Column 19,
Line 6, "necessarily" should read -- necessarily be --.
Line 18, "FIG. 14" should read -- FIG. 14, in the "Discrimination among P-image states" and --.
Line 20, "are named as" should read -- is called the --.
Line 22, "exist are named as" should read -- exists is called the --.
Line 32, "illustration" should read -- illustrations --.

Column 21,
Line 58, "corresponds" should read -- correspond --.

UNITED STATES PATENT AND TRADEMARK OFFICE
CERTIFICATE OF CORRECTION

PATENT NO. : 6,507,702 B2
DATED : January 14, 2003
INVENTOR(S) : Tadasu Ohtani

It is certified that error appears in the above-identified patent and that said Letters Patent is hereby corrected as shown below:

Column 22,
Line 1, "determine" should read -- determining --.
Line 20, "are" should read -- is --.
Line 63, "once gazed" should read -- gazed at one at a time --.

Column 23,
Line 10, "mode" should read -- modes --.
Line 29, "EEPRM." should read -- EEPROM. --.

Column 24,
Line 3, "rotate" should read -- rotates --.
Line 8, "consequent," should read -- consequence, --.
Line 19, "an" should read -- a --.
Line 26, "become" should read -- becomes --.
Line 36, "does" should read -- is --.
Line 45, "is" should read -- are --.
Line 54, "FIG 5A d" should read -- FIGS. 5A and --.

Column 25,
Line 22, "mains on" should read -- remains in the --.
Line 34, "gazed" should read -- gazed at --.
Line 59, "mode)" should read -- mode --.
Line 60, "step" should read -- (step --.
Line 63, "determining the configuration and that" should read -- determine the configuration and the --.

Column 26,
Line 10, "no" should read -- at no --.
Line 16, "$\partial 4$" should be deleted.
Line 17, "2py" should read -- $\theta 2py$ --.
Line 59, "EPPROMa," should read -- EEPROM 100a, --.

Column 27,
Line 49, "of n" should read -- n --.
Line 54, "proceed" should read -- proceeds --.

Column 28,
Line 11, "ad" should read -- and --.
Lines 22 and 57, "proceed" should read -- proceeds --.

UNITED STATES PATENT AND TRADEMARK OFFICE
CERTIFICATE OF CORRECTION

PATENT NO. : 6,507,702 B2
DATED : January 14, 2003
INVENTOR(S) : Tadasu Ohtani

It is certified that error appears in the above-identified patent and that said Letters Patent is hereby corrected as shown below:

Column 29,
Line 8, "then" should be deleted.
Line 9, "x1," should read -- (x1, --.
Line 12, "gazes" should read -- gazes at --.
Lien 13, "EEPROMa" should read -- EEPROM 100a --.
Line 25, "b" should be deleted.
Line 35, "gazes" should read -- gazes at --.
Line 46, "stage" should read -- state --.
Line 48, "times of" should be deleted.

Column 30,
Line 2, "key b0x," should read -- ky, b0x --.
Line 52, "time" should be deleted.
Line 53, "predetermined," should read -- predetermined time, --.
Line 59, "display" should read -- displays --.

Column 31,
Line 23, "gazing" should read -- gazing at --.
Line 37, "example" should read -- example is given --.

Column 32,
Line 46, "upwide" should read -- upside --.

Signed and Sealed this

Fourteenth Day of October, 2003

JAMES E. ROGAN
*Director of the United States Patent and Trademark Office*